(12) United States Patent
Okubo

(10) Patent No.: US 7,877,005 B2
(45) Date of Patent: Jan. 25, 2011

(54) COMMANDER FLASH APPARATUS AND SLAVE FLASH APPARATUS

(75) Inventor: Mitsumasa Okubo, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 88 days.

(21) Appl. No.: 12/198,695

(22) Filed: Aug. 26, 2008

(65) Prior Publication Data

US 2009/0060488 A1   Mar. 5, 2009

(30) Foreign Application Priority Data

Aug. 28, 2007   (JP)   ............................. 2007-221782

(51) Int. Cl.
    G03B 17/00   (2006.01)
    G03B 15/03   (2006.01)
    H04N 5/232   (2006.01)
(52) U.S. Cl. .................. 396/56; 396/176; 348/371; 348/211.2; 348/211.3
(58) Field of Classification Search .................. 396/56, 396/155, 176; 348/371, 211.2, 211.3
    See application file for complete search history.

(56) References Cited

FOREIGN PATENT DOCUMENTS

JP   05-093944   4/1993
JP   09-033988   2/1997

OTHER PUBLICATIONS

Second Notice of Rejection Ground for Chinese Patent Application No. 200810146966.0, mailed May 12, 2010 (7 pgs.) with translation (7 pgs.).
Third Notice of Rejection Ground for Chinese Patent Application No. 200810146966.0, mailed Sep. 30, 2010 (4 pgs.) with translation (3 pgs.).

*Primary Examiner*—Rochelle-Ann J Blackman
(74) *Attorney, Agent, or Firm*—Straub & Pokotylo; John C. Pokotylo

(57) ABSTRACT

A commander flash apparatus for use in a wireless flash system which continuously emits light from the commander flash apparatus, transmits from the commander flash apparatus to a slave flash apparatus the data corresponding to the emission time interval of the commander flash apparatus, and controls the flash emission of a slave flash apparatus includes: a data setting unit for setting emission control data for control of the emission of the slave flash apparatus and emission amount determination data for determination of an amount of emission of the slave flash apparatus as the transmission data; and a data transmission control unit for controlling the emission of the commander flash apparatus so that the emission time interval per bit of the digital data configuring the emission control data can be longer than the emission time interval per bit of the digital data configuring the emission amount determination data.

21 Claims, 30 Drawing Sheets

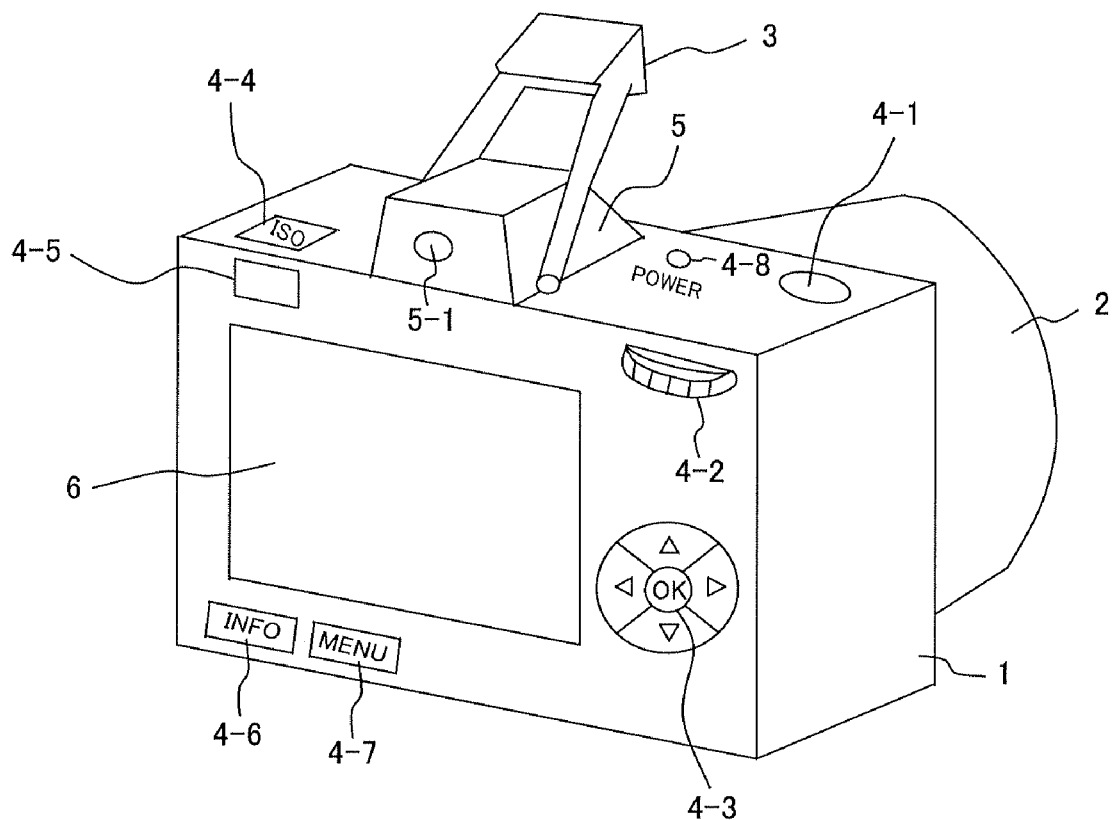
F I G. 1B

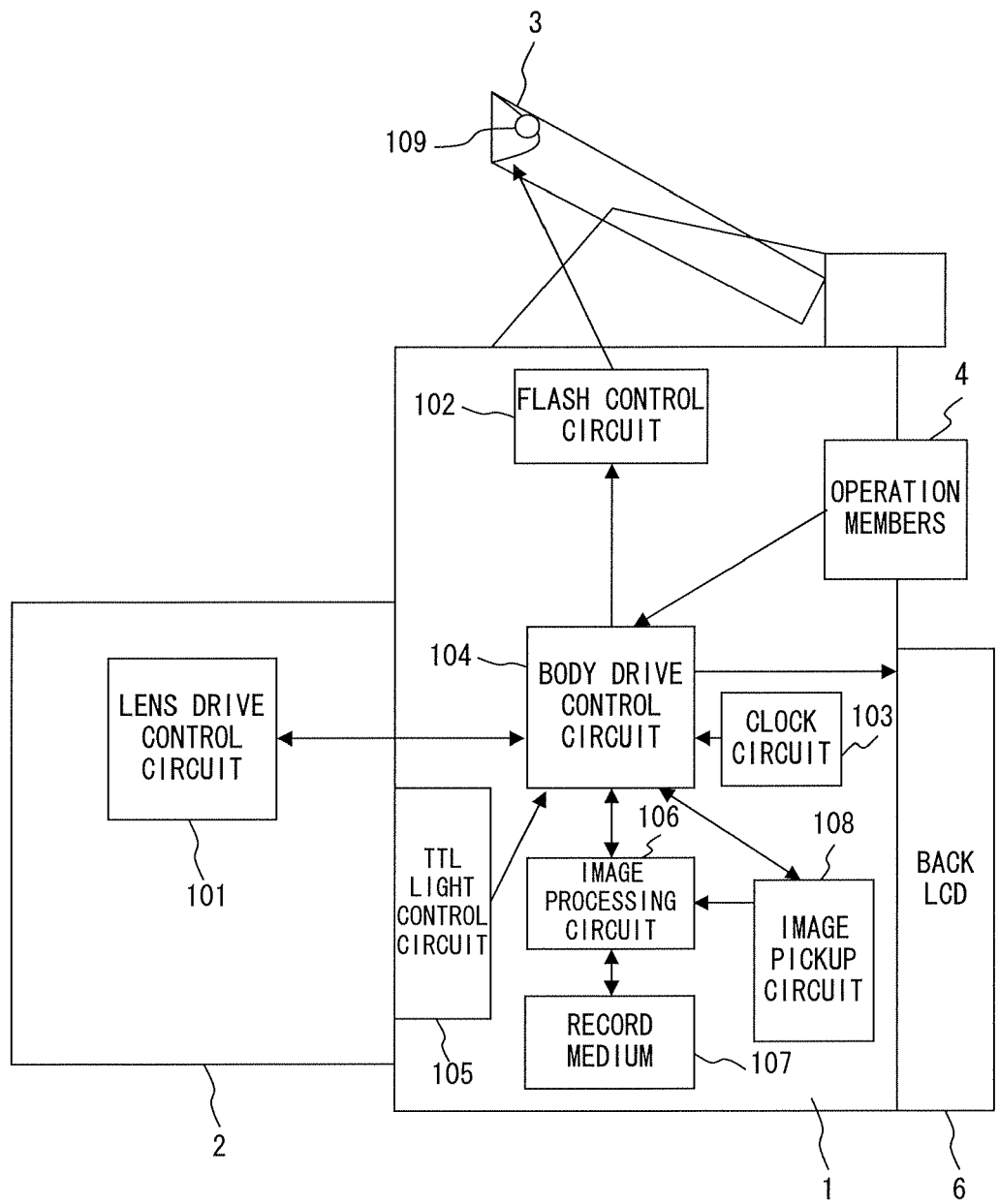
F I G. 4

DSP1

| P | 1/500 F4.5 | | |
|---|---|---|---|
| 2007. 05. 22 | | | |
| ISO 100 | WB AUTO | FLASH AUTO | PICTURE VIVID |
| AE ESP | AF iESP | FOCUS AF | DRIVE SINGLE |
| XD | HQ | | 12 |

INFO ON

INFO ON

DSP2

(RC ON)   INFO ON   (RC OFF)

DSP3

| P | 1/250 F4.5 | | | |
|---|---|---|---|---|
| 2007. 05. 22 | | | | |
| GROUP | MODE | VALUE | FP ON/OFF | |
| A | TTL | +1.7 | OFF | |
| B | AUTO | −0.5 | CH | 1 |
| C | M | 1/4 | 12 | |

INFO ON

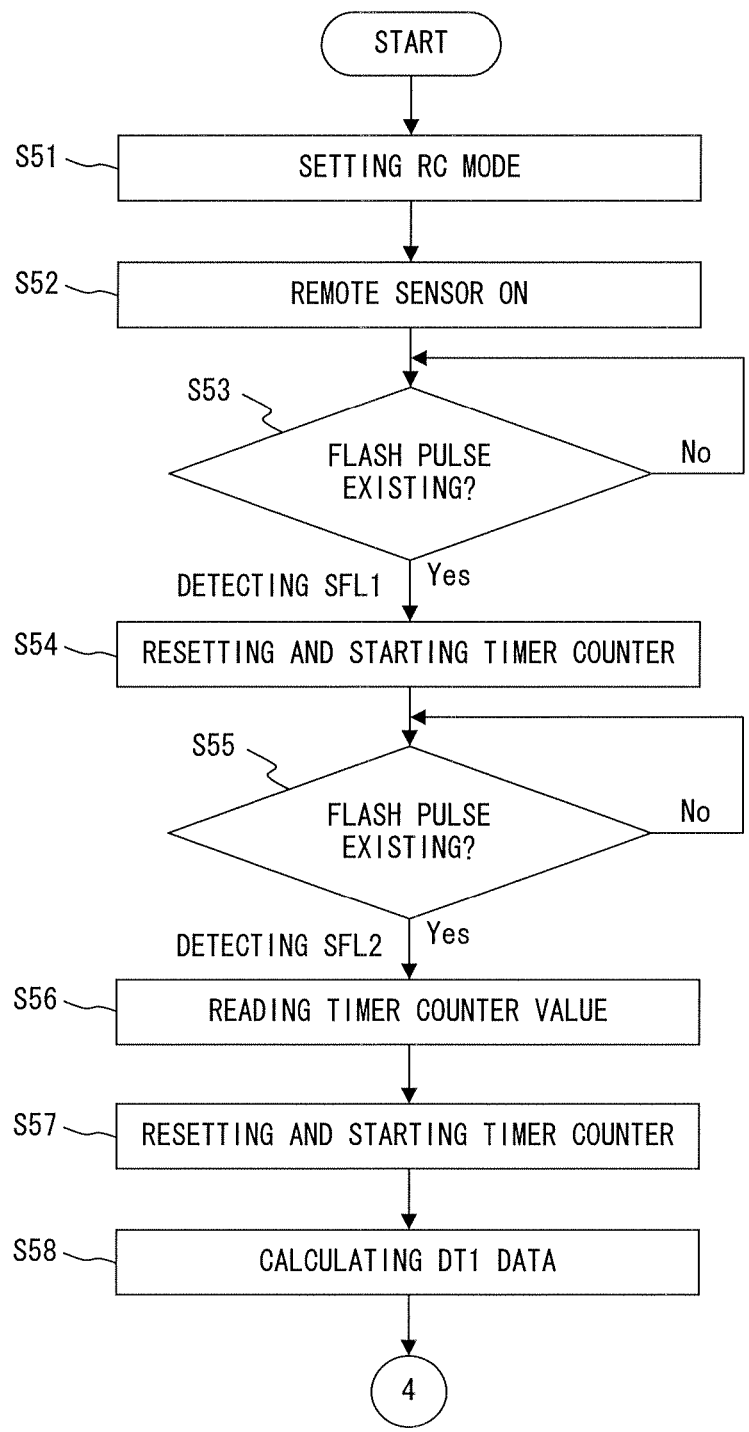
F I G. 1 0 A

DATA CORRESPONDENCE

DT1, DT2, DT3 (3-BIT DATA)

| DT1 | 2 BITS FOR CHANNEL DATA, AND 1 BIT FOR FLASH EMISSION/FP EMISSION IDENTIFICATION |
|---|---|
| DT2 | IDENTIFICATION OF EACH OF GROUPS A, B, AND C, MODE REQUIRING PRE-EMISSION, OR MODE NOT REQUIRING PRE-EMISSION<br>1 BIT FOR EACH OF A, B, AND C |
| DT3 | DETAILED MODE SETTING FOR EACH OF GROUPS A, B, AND C<br>(DETERMINING MODE BY COMBINATION OF DT1 AND DT2)<br>1 BIT FOR EACH OF A, B, AND C |

FIG. 11

DATA CORRESPONDENCE
DT4, DT5, AND DT6 (5-BIT DATA)

AMOUNT OF EMISSION DURING MANUAL EMISSION

| DATA | 0 | 1 | 2 | 3 | 4 | 5 | 6 | 7 |
|---|---|---|---|---|---|---|---|---|
| AMOUNT OF EMISSION | 0 | 0 | 1/1 | 1/1 | 1/1.3 | 1/1.6 | 1/2 | 1/2.5 |
| DATA | 8 | 9 | 10 | 11 | 12 | 13 | 14 | 15 |
| AMOUNT OF EMISSION | 1/3 | 1/4 | 1/5 | 1/6 | 1/8 | 1/10 | 1/13 | 1/16 |
| DATA | 16 | 17 | 18 | 19 | 20 | 21 | 22 | 23 |
| AMOUNT OF EMISSION | 1/20 | 1/25 | 1/32 | 1/40 | 1/50 | 1/64 | 1/80 | 1/100 |
| DATA | 24 | 25 | 26 | 27 | 28 | 29 | 30 | 31 |
| AMOUNT OF EMISSION | 1/128 | 1/160 | 1/200 | 1/256 | 1/256 | 0 | 0 | 0 |

FIG. 12

| DSP1 | RC OFF |
|------|--------|
| DSP2 | RC OFF |
| DSP3 | RC ON  |

FIG. 14

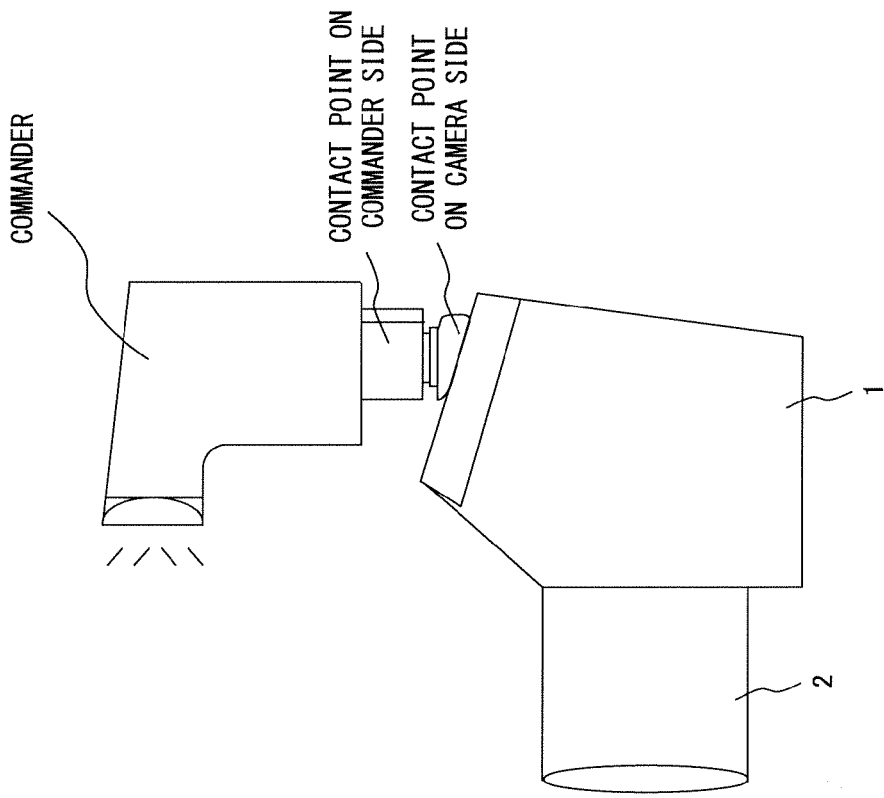
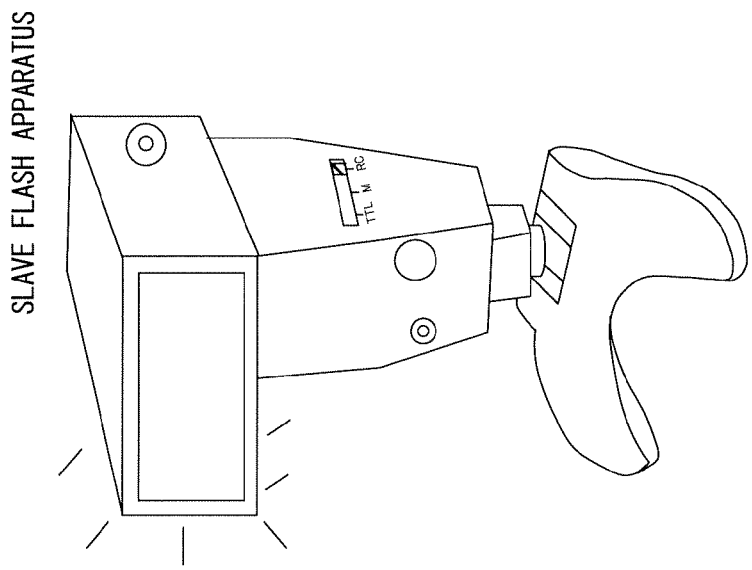
FIG. 15

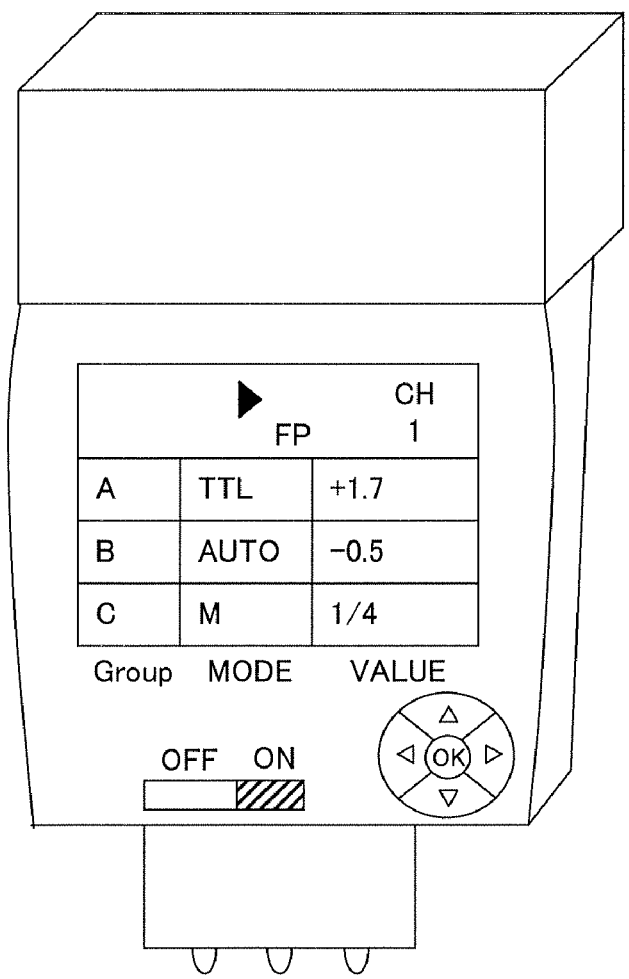
F I G. 17

DSP1

| P | 1/500 F4.5 | | |
|---|---|---|---|
| 2007. 05. 22 | | RC | |
| ISO 100 | WB AUTO | FLASH AUTO | PICTURE VIVID |
| AE ESP | AF iESP | FOCUS AF | DRIVE SINGLE |
| XD | HQ | | 12 |

INFO ON

INFO ON

DSP2

INFO ON

DSP3

| P | 1/250 F4.5 | | | |
|---|---|---|---|---|
| 2007. 05. 22 | | RC | | |
| GROUP | MODE | VALUE | FP ON/OFF | |
| A | TTL | +1.7 | OFF | |
| B | AUTO | −0.5 | CH | 1 |
| C | M | 1/4 | 12 | |

INFO ON

COMMANDER FLASH APPARATUS AND SLAVE FLASH APPARATUS

CROSS REFERENCE TO RELATED APPLICATIONS

This application is based upon and claims the benefit of priority from the prior Japanese Patent Application No. 2007-221782, filed Aug. 28, 2007, the entire contents of which are incorporated herein by reference.

BACKGROUND OF THE INVENTION

1. Field of the Invention

The present invention relates to a wireless flash system which is used as an auxiliary illumination device of an image pickup apparatus etc. and capable of emission controlling a slave flash apparatus by wireless communication control from a commander flash apparatus (or a master flash apparatus).

2. Description of the Related Art

Conventionally known is a flash system which emission-controls a flash (slave flash) as auxiliary illumination for an image pickup apparatus by wireless using a commander flash of an image pickup apparatus under the optical communication control by a commander flash of the image pickup apparatus.

A flash system in a method for detecting on the slave flash apparatus side the data such as an amount of emission etc. as an emission time interval, and controlling a slave flash apparatus on the basis of the detection result has been disclosed (for example, Japanese Patent No. 3061437). Thus, the method of transmitting data in the emission time interval of a flash enables data of a larger number of bits to be transmitted at an emission frequency of a commander flash apparatus as compared with the method of transmitting binary data depending on the presence/absence of flash emission with the timing of a predetermined clock, thereby excelling in a less energy loss.

SUMMARY OF THE INVENTION

A commander flash apparatus according to an embodiment of the present invention for use in a wireless flash system which continuously emits light from the commander flash apparatus, transmits from the commander flash apparatus to a slave flash apparatus the data corresponding to the emission time interval of the commander flash apparatus, and controls the flash emission of a slave flash apparatus includes:

a data setting unit for setting emission control data for control of the emission of the slave flash apparatus and emission amount determination data for determination of an amount of emission of the slave flash apparatus as the transmission data; and a data transmission control unit for controlling the emission of the commander flash apparatus so that the emission time interval per bit of the digital data configuring the emission control data can be longer than the emission time interval per bit of the digital data configuring the emission amount determination data, thereby controlling the data transmission.

BRIEF DESCRIPTION OF THE DRAWINGS

FIG. 1B is a back perspective view of the digital camera according to the first embodiment of the present invention;

FIG. 4 shows the configuration of the block diagram of the circuit of the camera according to the first embodiment of the present invention;

FIG. 10A shows the flow (1) of the operation of the slave flash apparatus according to the first embodiment of the present invention;

FIG. 11 shows the contents of the data of DT1, DT2, and DT3 according to the first embodiment of the present invention;

FIG. 12 shows the correspondence between the data of DT4, DT5, and DT6, and the value for use in the actual emission control according to the first embodiment of the present invention;

FIG. 14 shows the correspondence table between the shooting condition display screen and RC mode ON/OFF;

FIG. 15 shows the situation when the wireless flash system according to the third embodiment of the present invention is used;

FIG. 17 shows the panel display of a back LCD 160 of the commander flash apparatus according to the third embodiment of the present invention;

DESCRIPTION OF THE PREFERRED EMBODIMENTS

Figure 1A:
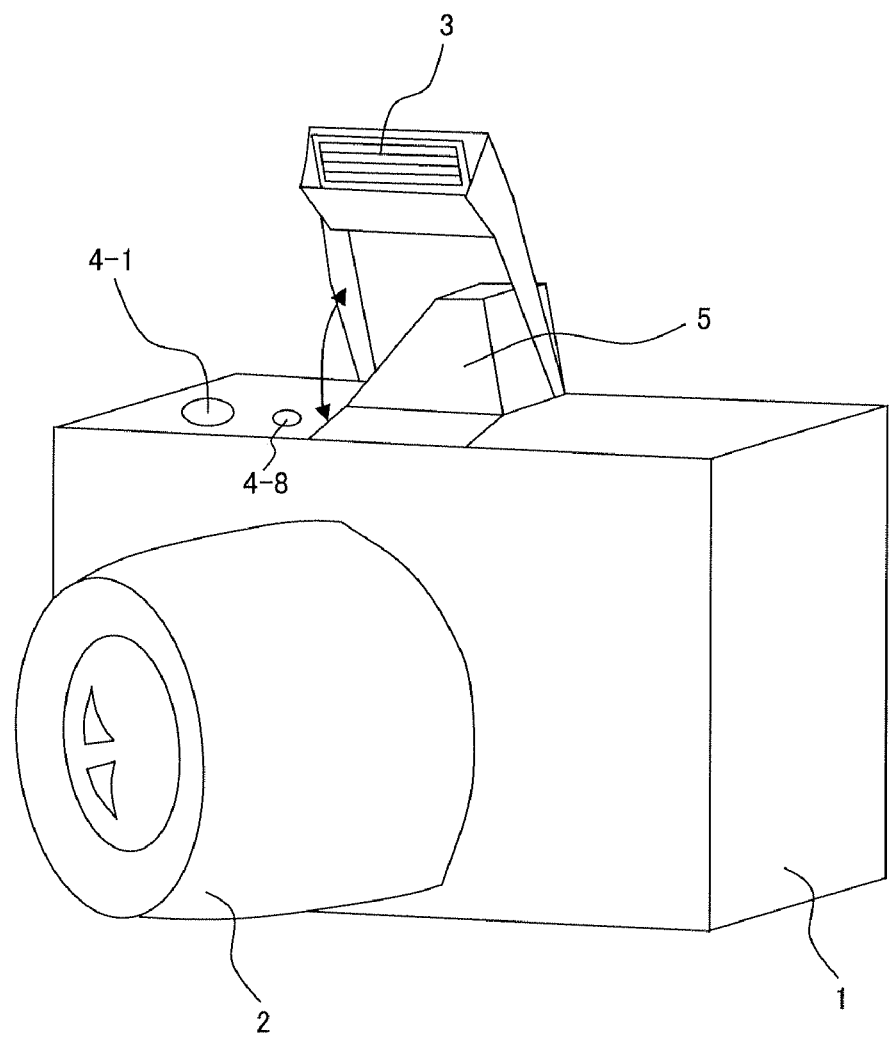
FIG. 1A is a front perspective view of the digital camera according to the first embodiment of the present invention.

A commander flash apparatus according to an embodiment of the present invention for use in a wireless flash system which continuously emits light from the commander flash apparatus, transmits from the commander flash apparatus to a slave flash apparatus the data corresponding to the emission time interval of the commander flash apparatus, and controls the flash emission of a slave flash apparatus includes a data setting unit and a data transmission control unit.

The data setting unit sets the emission control data for control of the emission of the slave flash apparatus and the emission amount determination data for determination of the amount of emission of the slave flash apparatus as the transmission data. The data setting unit corresponds to, for example, a body drive control circuit 104 according to the present embodiment.

The data transmission control unit controls the emission of the commander flash apparatus so that the emission time interval per bit of the digital data configuring the emission control data can be longer than the emission time interval per bit of the digital data configuring the emission amount determination data, thereby controlling the data transmission. The data setting unit corresponds to, for example, the function of controlling the flash control circuit of the body drive control circuit 104 according to the present embodiment.

With the above-mentioned configuration, although there is an error in detecting time, an occurrence of a serious malfunction can be suppressed. In addition, a less expensive circuit configuration with no very high accuracy can be realized.

In addition, the emission control data includes at least one of the emission mode data for setting the emission mode of the slave flash apparatus and the channel data for suppression of the mutual crosstalk between users by identifying the slave flash apparatus.

With the configuration, although there is an error in detecting time, an occurrence of a serious malfunction of changing a mode, a function of a slave flash apparatus of an unexpected channel, and a serious malfunction of an inoperable slave flash apparatus, etc. can be suppressed. Furthermore, a less expensive circuit configuration with no very high accuracy can be realized.

The data transmission control unit controls the emission of the commander flash apparatus so that the amount of time allowance of data in the upper limit range and the lower limit range of the amount of emission of the slave flash apparatus can be larger than the amount of time allowance of data in the range other than the upper limit or the lower limit.

With the configuration, although there is an error in detecting time, an occurrence of a serious malfunction in which the data of the maximum or the minimum amount of emission exceeds a predetermined allowance limit and a slave flash apparatus determines an error and suppresses an emission operation of flash apparatus can be avoided. Furthermore, a less expensive circuit configuration with no very high accuracy can be realized.

The data transmission control unit controls the emission of the commander flash apparatus so that the number of bits of the digital data configuring the emission control data transmitted at the emission interval can be smaller than the number of bits of the digital data configuring the emission amount determination data transmitted at the emission interval of the commander flash apparatus.

With the configuration, although there is an error in detecting time, a change unit of time during mode or channel detection is large. Therefore, an occurrence of a serious malfunction in which a mode or a channel is changed can be avoided. Furthermore, a less expensive circuit configuration with no very high accuracy can be realized.

In addition, the data transmission control unit controls the emission of the commander flash apparatus so that the longest time of the emission time interval corresponding to the digital data configuring the emission control data can be shorter than the longest time of the emission time interval corresponding to the digital data configuring the emission amount determination data.

With the configuration, although there is an error in detecting time, the maximum value of the time corresponding to the data during mode or channel detection can be small, and an error caused by a clock shift occurring when the time is long can be suppressed, thereby suppressing an occurrence of a serious malfunction in which a mode or a channel is changed.

The data transmission control unit controls the emission of the commander flash apparatus so that the offset of the emission time interval corresponding to the digital data of the emission control data can be substantially equal to the offset of the emission time interval corresponding to the digital data configuring the emission amount determination data, and the offset time can be higher than the intermediate value of the maximum amount of change made corresponding to the transmission data.

With the configuration, a small and less expensive circuit having a relatively long emission interval can be used as a flash emission circuit. In addition, the rate of a change in total communication time can be minimized, the release time lag during shooting can be unified, and the disagreeable feeling of a user can be reduced.

The data transmission control unit sets the time obtained by adding the time corresponding to the transmission data to a predetermined fixed time as an emission time interval of a flash, and controls the emission of the commander flash apparatus on the basis of the set emission time interval.

With the configuration, since the offset time of the data communication can be effectively used without waste, and data is converted into available data each time data is received, control can be passed to a shooting operation immediately after communications are completed with reduced release time lag.

The commander flash apparatus can further function as the slave flash apparatus, and includes a reception unit for receiving transmission data from the commander flash apparatus, and an emission control unit for emission controlling the commander flash apparatus on the basis of the received data.

With the configuration, a commander flash apparatus having the function of a slave flash can be provided.

The commander flash apparatus further includes a display screen for setting the emission of the slave flash apparatus and displaying the contents of the setting by rows and columns separately, and the data transmission control unit controls the emission of the commander flash apparatus so that the data corresponding to a predetermined row or column of the display screen can be assigned a longer time per bit of the digital data during transmission than the data of other rows or columns.

With the configuration, data in an area in which a user can visually recognize the importance in function, for example, a mode can be transmitted without fail.

The slave flash apparatus for receiving data from the commander flash apparatus according to an embodiment of the present invention includes an emission control unit for controlling the emission of the slave flash apparatus on the basis of the received data.

With the configuration, data can be received from the commander flash apparatus, and emission can be performed according to the received data.

The slave flash apparatus further includes an emission data processing unit. The emission data processing unit sets the time obtained by adding the time corresponding to the transmission data to a predetermined fixed time by the commander flash apparatus as the emission time interval of a flash, and processes the conversion from the data corresponding to the emission time interval of the flash received by the flash pulse immediately before in flash pulses on the basis of the emission corresponding to the set emission interval time to the data used during the emission control in the predetermined fixed time until the next flash pulse is generated.

With the configuration, the offset time of data communication can be effectively used without waste, and data is converted into available data each time the data is received. Therefore, control is passed to a shooting operation immediately after completion of the communication, thereby minimizing release time lag.

The embodiments of the present invention are described below with reference to the attached drawings. The embodiments of the present invention described below are a part of a number of embodiments, and the present invention is not limited to the embodiments described below.

First Embodiment

When data corresponding to a number of bits is to be transmitted at a long emission interval, the timing setting of a transmitting/receiving circuit and a time error of a timing count unit are often large between the commander flash apparatus side and the slave flash apparatus side. As a result, there is the possibility that an error occurs between the data transmitted from the commander flash apparatus and the data received by the slave flash apparatus. Especially, the slave flash that is normally not provided with an expensive crystal oscillator can generate a time detection error of 0.5% or more.

There is an idea of minimizing an error by reducing the time resolution per bit, or decreasing the number of bits of data expressed by one flash emission interval. Then, however, the emission frequency of a commander flash apparatus increases, an energy loss is developed, and the time required for communications becomes long.

Next, when communication data is not correctly transmitted, the accuracy of the data for an amount of emission is degraded by the amount of emission. On the other hand, when control information of a channel, an emission mode, etc. is erroneously transmitted, a function may not correctly operates, a malfunction occurs, etc., thereby generating a serious problem with a shot image of an image pickup apparatus.

In the first through fourth embodiments of the present invention, a commander flash apparatus and a slave flash apparatus capable of performing an emitting operation of the slave flash apparatus in the wireless flash system are realized at the minimum time lag without a malfunction. Especially described is the wireless flash system for reducing the time resolution of the control data for indication of a channel and an emission mode than that of the data for determination of an amount of emission in the first embodiment in the wireless communication from the commander flash apparatus to the slave flash apparatus.

FIGS. 1A and 1B are a front perspective view and a back perspective view of the digital camera according to an embodiment of the present invention. The digital camera shown in FIGS. 1A and 1B is used in a wireless flash system, and has a built-in flash device functioning as a commander flash apparatus.

A camera body 1 is, for example, a single-lens reflex camera. A lens unit 2 can be freely attached to and detached from the camera body 1. When it is attached to the camera body 1, it functions in cooperation with the camera body.

A pop-up built-in flash 3 can function as a commander flash apparatus of a wireless flash system.

Operation members 4 of the camera are a release button 4-1, an electronic dial 4-2, a cross button 4-3, an ISO button 4-4, an exposure correction button 4-5, an INFO button 4-6, a menu button 4-7, and a power button 4-8.

The release button 4-1 is configured by a 2-stage half-press and full-press button. The electronic dial 4-2 is used when a value is changed and set.

The cross button 4-3 is configured by four upper, lower, left, and right buttons and a central OK button. The cross button 4-3 is used in selecting and determining an item when a menu displayed on a back LCD (liquid crystal display) 6 is opened.

By turning the electronic dial 4-2 while pressing the ISO button 4-4, the sensitivity of the ISO of the image pickup device can be changed. By turning the electronic dial 4-2 while pressing the exposure correction button 4-5, the exposure correction value can be changed.

By operating the INFO button 4-6, the display mode of the back LCD 6 of the camera body 1 can be selected. When the menu button 4-7 is pressed, a menu screen for various settings can be displayed on the back LCD 6 of the camera body 1. By operating the power button 4-8, the camera body 1 can be turned on/off.

A finder unit 5 generates an observed image from the light passing through the lens unit 2 using the mirror, a pentaprism in the finder, and an eye piece 5-1.

The back LCD 6 displays a shot image, a live view for observation, and various types of information. The display and change of a set value can be confirmed on the back LCD 6.

Figure 2:
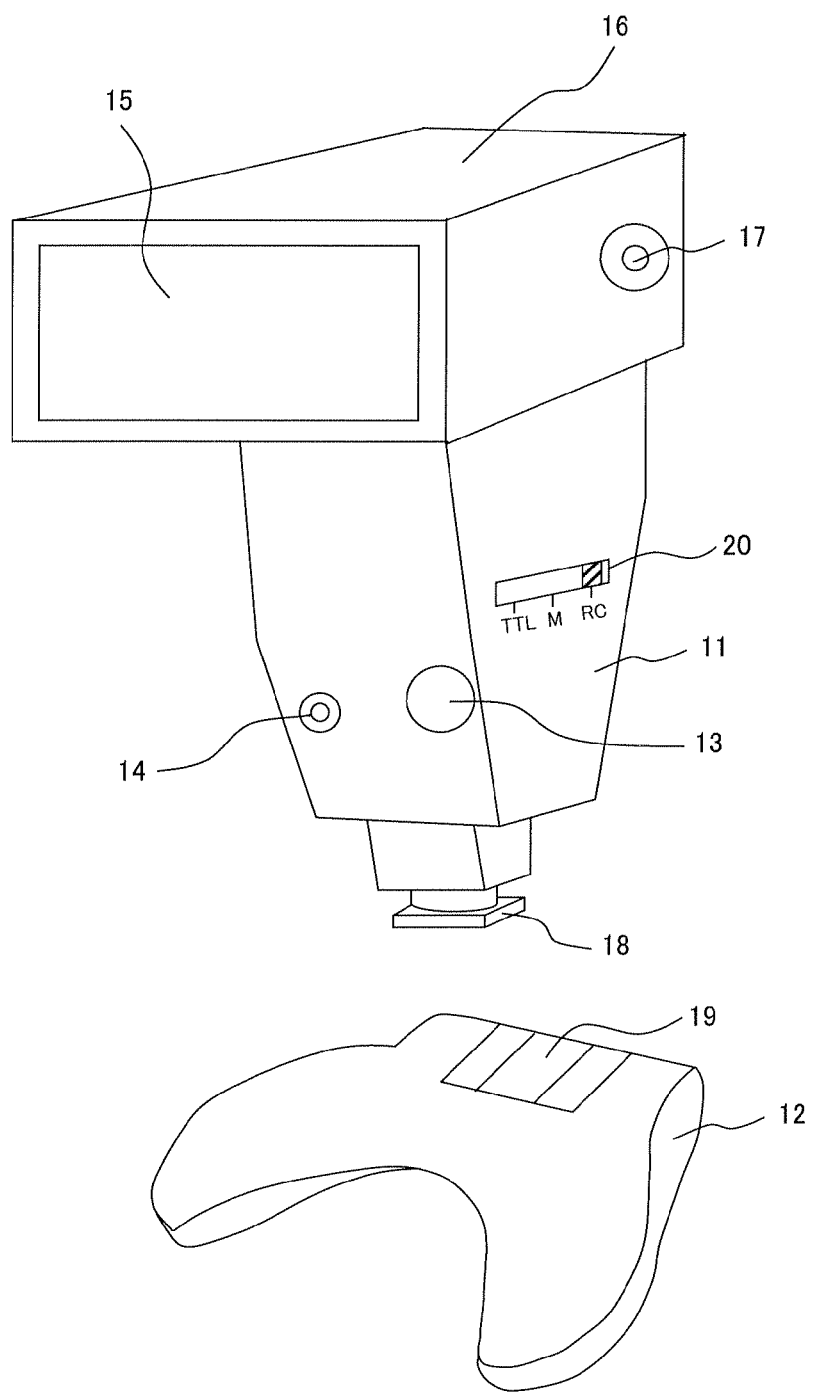
FIG. 2 shows the slave flash apparatus according to the first embodiment of the present invention.

FIG. 2 shows a slave flash apparatus according to the present embodiment. In FIG. 2, the slave flash apparatus (remote flash apparatus) of the wireless flash system according to the present embodiment is shown.

In FIG. 2, the slave flash apparatus is mainly includes a slave flash apparatus body 11 and a stand 12 attachable to and detachable from the slave flash apparatus body 11. The slave flash apparatus body 11 is provided with a slave sensor 13, an external light control sensor 14 for flash light control, a light emission window 15, a light emission unit 16, a lock release button 17, a hot shoe 18, and a mode switch 20.

A hot shoe receiver 19 of the stand 12 can be engaged with the hot shoe 18 of the slave flash apparatus body 11.

The slave sensor 13 receives signal flash light from the commander flash apparatus and generates an electric signal by optoelectronic conversion of the light.

Light control in the wireless flash system can be TTL light control performed by a TTL sensor on the camera side and flash apparatus side light control performed by a sensor on the flash side. The external light control sensor 14 is used for the flash apparatus side light control.

The light emission unit 16 can be turned with respect to the slave flash apparatus body 11 while pressing the lock release button 17. The hot shoe 18 can be attached to the hot shoe unit of the camera, and can also be engaged with the stand 12.

The mode switch 20 can switch among three modes of "TTL", "M", and "RC". "TTL" and "M" indicate the control mode when the flash apparatus body is attached to the camera. "RC" indicates that the flash apparatus functions as a slave flash apparatus of the wireless flash system.

Figure 3:
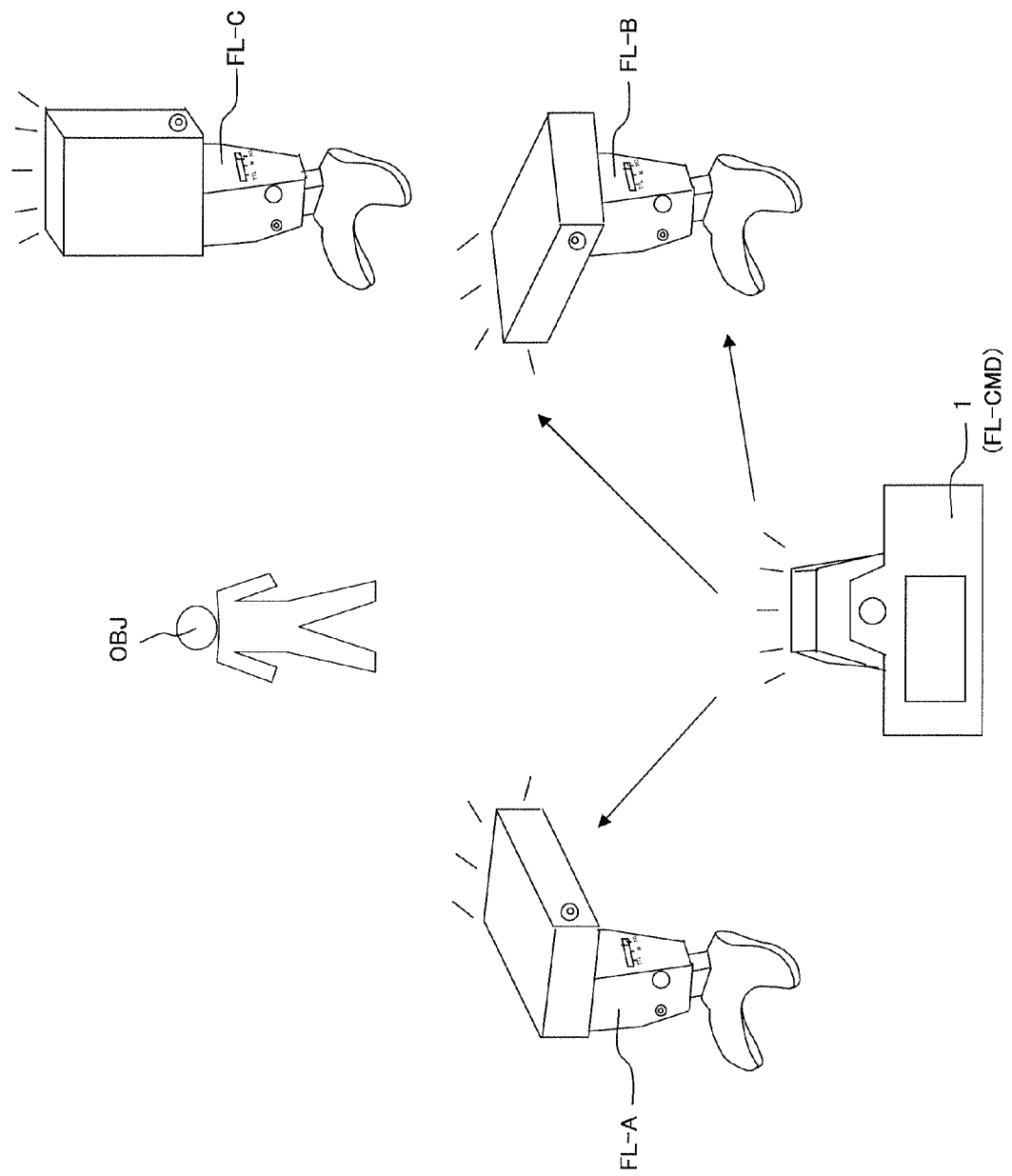
FIG. 3 shows the situation when the wireless flash system according to the first embodiment of the present invention is used.

FIG. 3 shows the state when the wireless flash system is used in the present embodiment. An object OBJ is arranged in front of the camera body 1 as a commander flash apparatus according to the present embodiment. The three slave flash apparatuses are configured by an FL-A of a group A, an FL-B of a group B, and an FL-C of a group C, and each flash apparatus is a slave flash apparatus shown in FIG. 2.

The mode switch 20 of each slave flash apparatus is set to "RC". By the group setting unit shown in the attached drawings, the FL-A is set as a "group A", the FL-B is set as a "group B", and the FL-C is set as a "group C".

A commander flash apparatus FL-CMD can independently control each group. In addition, the slave flash apparatus of each group emits light according to the setting specified by the FL-CMD.

FIG. 4 shows the internal configuration of the camera according to the present embodiment. A lens drive control circuit 101 is provided in the lens unit 2. The lens drive control circuit 101 controls the drive of the focus, iris, etc. of the lens at an instruction from the body side.

A flash control circuit 102, a clock circuit 103, a body drive control circuit 104, a TTL light control circuit 105, an image processing circuit 106, a record medium 107, and an image pickup circuit 108 are provided in the camera body 1.

The flash control circuit 102 controls the emission of an emission unit 109 of the built-in flash device (commander flash apparatus) 3 under the control of the body drive control circuit 104.

The clock circuit 103 is a circuit using, for example, a crystal oscillator. Since the clock circuit 103 includes a number of portions such as an image pickup device for which high precision time control is required, a high precision crystal oscillator is used.

The body drive control circuit 104 is configured mainly by a digital circuit operating on the basis of a clock of the clock circuit 103. The body drive control circuit 104 controls each block in the camera body 1, and issues an instruction of an operation to the lens drive control circuit 101. The body drive control circuit 104 issues an emission instruction to the flash control circuit 102 for wireless data communication. Furthermore, the body drive control circuit 104 detects operations of the operation members 4, and performs processes corresponding to the operations.

The TTL light control circuit 105 measures the flash light passing through the lens unit 2 during pre-emission. Based on the result of measuring the light, the body drive control circuit 104 determines the amount of emission.

The image pickup circuit 108 performs signal processing such as correlation duplex sampling (CDS) processing, AGC processing, and an A/D conversion etc. on an image signal output from an image pickup device such as a CCD etc. The image pickup circuit 108 obtains digital image data (hereinafter referred to as image data).

The image processing circuit 106 performs image processing such as white balance correction, resizing, etc. on the image data output from the image pickup circuit 108. The record medium 107 stores image data output from the image processing circuit 106 and compressed by the JPEG compressing system etc. The image processing circuit 106 reads compressed image data recorded in the record medium 107, decompresses the data, outputs the decompressed image data to the back LCD 6, and displays the image.

Figure 5:
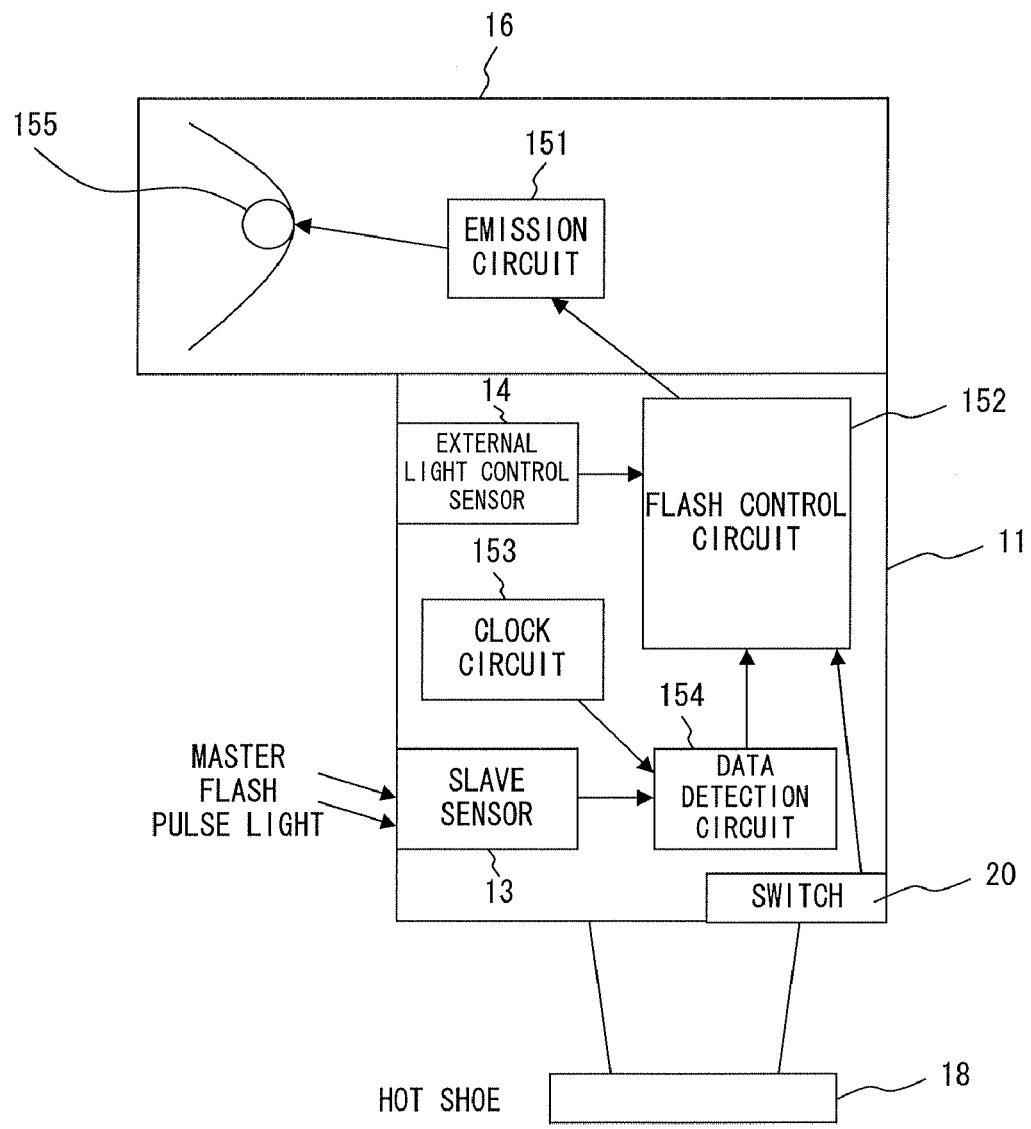
FIG. 5 shows the configuration of the block diagram of the circuit of the slave flash apparatus according to the first embodiment of the present invention.

FIG. 5 shows the configuration of the block diagram of the circuit of the slave flash apparatus according to the present embodiment. The emission circuit 151 is provided in the light emission unit 16, and instructs an external flash emission unit 155 to emit light at an instruction from a flash control circuit 152. The flash control circuit 152 controls the emission circuit 151 on the basis of the information from various sensors and the operation members to control the emission of a flash apparatus etc.

The clock circuit 153 can be an operation clock of a digital portion of the flash control circuit 152, and can also be a clock for measuring inter-pulse time of the slave sensor 13.

The data detection circuit 154 counts the pulses using a clock of the clock circuit 153 for the interval of pulse signals corresponding to the embodiment signal from the commander flash apparatus output from the slave sensor 13. The count data is read by the flash control circuit 152.

Figure 6:
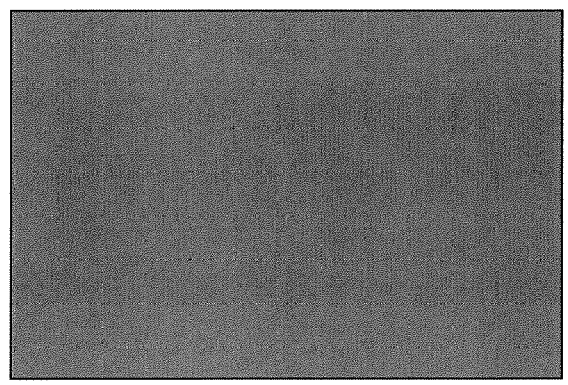
FIG. 6 shows the shooting condition display screen of a back LCD 6 according to the first embodiment of the present invention.

FIG. 6 shows the shooting condition display screen of the back LCD 6 according to the present embodiment. The shooting condition display screen is displayed on the back LCD 6 (panel display for control) of the camera body 1 functioning as a commander flash apparatus according to the present embodiment. The display is set as switchable by the INFO button 4-6 on the back of the camera body.

The display state expressed by a DSP1 is a normal display state, and is displayed for an item frequently confirmed in a normal shooting operation. When a set item is selected by an OK button and a cross key on the display, a setting can be changed on the display.

The display state expressed by a DSP2 is a state in which the display of the back is turned off. When power consumption is saved and when the light from a panel presents an obstacle when a user uses a finder, the backlight of the back LCD 6 is turned off.

The display state expressed by a DSP3 is a display of a panel for control exclusively when a wireless remote control shooting is performed. The display is performed only when the wireless remote control of a flash is selected by a setting menu not shown in the attached drawings (the mode is hereinafter referred to as an RC mode).

In the DSP3, the settings of each group can be displayed in a matrix. As with the DSP1, a setting can be changed using an OK button and a cross key while seeing the display. When a release button is pressed on the display, a flash shooting operation under the wireless remote control is performed, a shot image is displayed for a predetermined time (REC view), and then control is returned to the display state before the shooting operation.

Only when wireless remote control is selected (that is, when the RC mode is set in the ON position), the transition to the DSP3 can be performed. When the wireless remote control is not selected (that is, when the RC mode is set in the OFF position), the DSP3 is not transferred to the display state of the DSP3, but the transition of only the DSP1 and the DSP2 is performed.

In the present embodiment, when flash shooting under the wireless remote control is set in a predetermined setting method, the slash shooting can be performed under the wireless remote control in any of the DSP1, the DSP2, and the DSP3.

In the present embodiment, when the RC mode is turned on, the display of the back LCD 6 is switched to the display of the DSP3, setting relating to a flash is performed for each group, or the settings can be confirmed.

Figure 7:
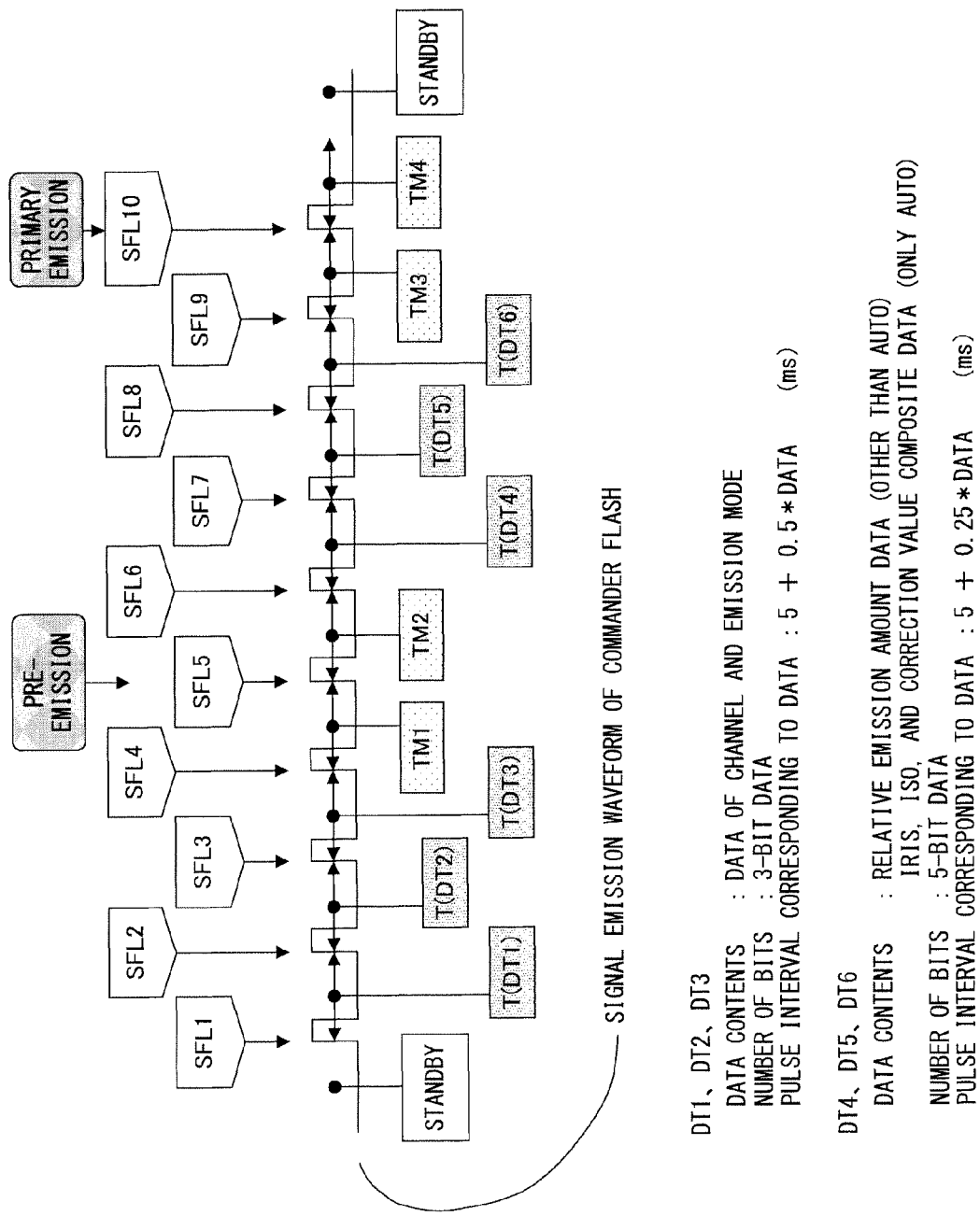
FIG. 7 shows the mode of the communication using flash light of the wireless flash system according to the first embodiment of the present invention.

FIG. 7 shows the mode of the communication by flash light of the wireless flash system according to the present embodiment. In the present embodiment, a commander flash apparatus emits light, for example, ten times per shooting operation.

It is assumed that SFL1 indicates the first emission in a series of communications, SFL2 indicates the second emission, . . . , and SFL10 indicates the tenth emission. It is also assumed that T(DT1) indicates that the emission time interval of SFL1 and SFL2 indicates T(DT1), and subsequently T(DT2), TM1, TM2, T(DT4), T(DT5), T(DT6), and TM3. The slave flash apparatus performs pre-emission in synchronization with SFL5, and performs primary emission in synchronization with SFL10.

At T(DT1), T(DT2), and T(DT3), the data of the emission mode of each channel and group is transmitted as digital data corresponding to the emission time interval. Each of DT1, DT2, and DT3 is configured by 3 bit data, and each piece of data is represented by pulse interval time T(DT1), T(DT2), and T(DT3) obtained by adding 0.5 ms per bit to the offset of the pulse interval 5 ms.

On the other hand, each of DT4, DT5, and DT6 is data corresponding to the amount of emission of groups A, B, and C respectively. Each of DT4, DT5, and DT6 is transmitted as digital data corresponding to the emission time interval. Each of DT4, DT5, and DT6 is configured by 5 bit data, and each piece of data is represented by a pulse interval time T(DT4), T(DT5), and T(DT6) obtained by adding 0.25 ms per bit to the offset of the pulse interval 5 ms.

Thus, according to the present embodiment, the data including the information about a channel and an emission mode is configured by the data corresponding to the amount of flash emission, or the number of bits less than the data relating to the iris value of the amount of flash emission, ISO sensitivity setting, and a composite correction value of a camera for determination, and double lower time resolution of the data is set, that is, an amount of double allowance is set for the time error.

All data has a predetermined offset time of 5 ms, and a time corresponding to data is added to the offset time. Therefore, according to present embodiment, the pulse interval time T(DT1), T(DT2), and T(DT3) is 5 ms at minimum (in case of data 0), and 8.5 ms at maximum (in case of data 7). The pulse interval time T(DT4), T(DT5), and T(DT6) is 5 ms at minimum (in case of data 0), and 12.7 ms at maximum (in case of data 31).

The emission of the commander flash apparatus is controlled so that the offset of the emission time interval T(DT1), T(DT2), and T(DT3) can be substantially equal to the offset of the emission time interval T(DT4), T(DT5), and T(DT6), and the offset time can be higher than the intermediate value of the amount of maximum change corresponding to the transmission data.

For example, when the pulse interval time T(DT1), T(DT2), and T(DT3) is set, the intermediate value of the amount of maximum change 3.5 ms (=8.5−5) is 1.75 ms. Therefore, offset time 5 ms>intermediate value of amount of maximum change 1.75 ms.

When the pulse interval time T(DT4), T(DT5), and T(DT6) is set, the intermediate value of the amount of maximum change 7.75 ms (=12.75−5) is 3.875 ms. Therefore, offset time 5 ms>intermediate value of amount of maximum change 3.875 ms.

Thus, a small and less expensive circuit having a relatively large emission interval can be used as a flash emission circuit. In addition, the rate of change in total communication time can be reduced, and the release time lag during shooting can be standardized, thereby reducing the disagreeable feeling of a user.

Figure 8:
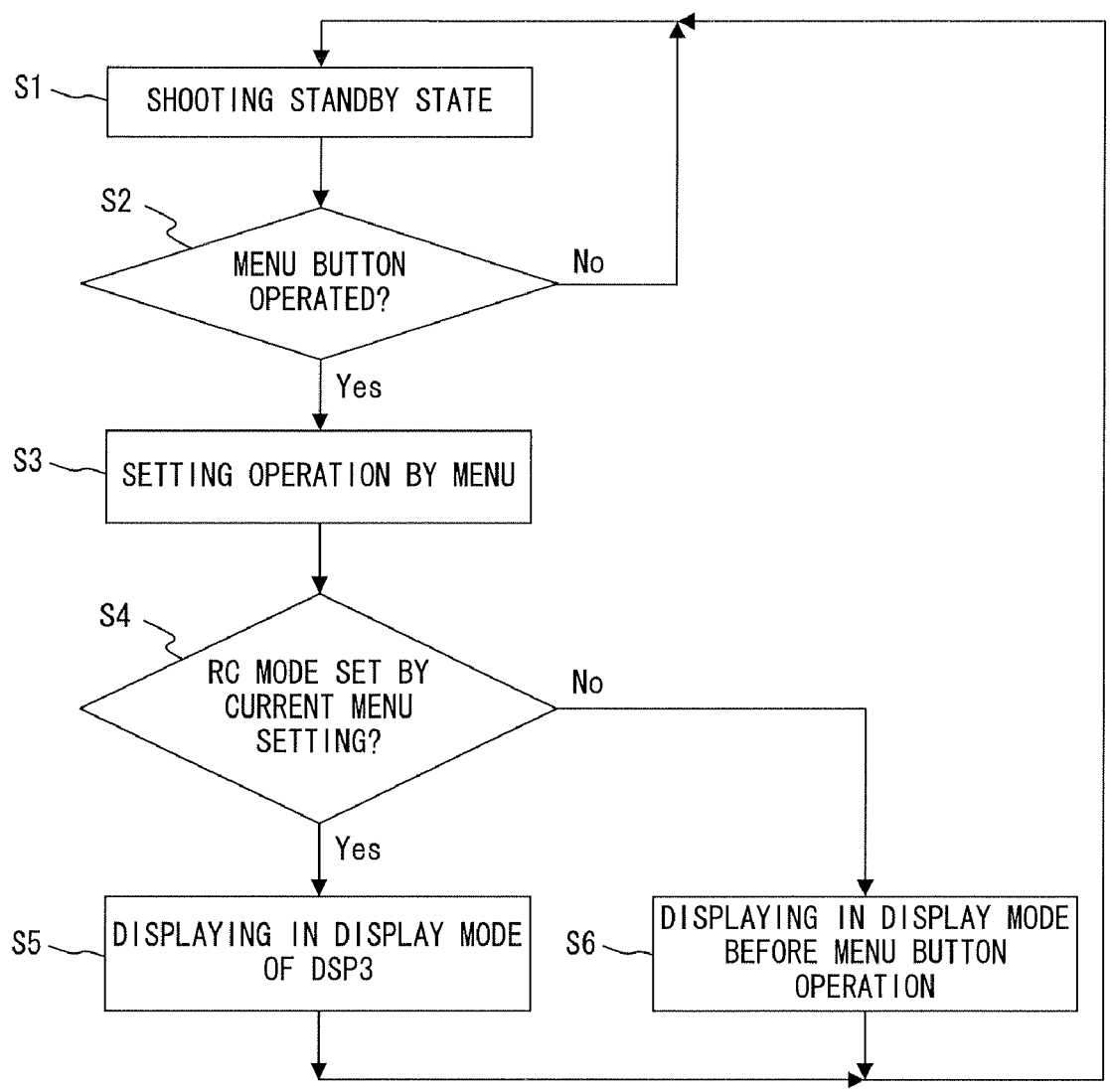
FIG. 8 shows a set flow of the RC mode in which a slave flash apparatus is controlled by wireless communications for a camera functioning as a commander flash apparatus.
Figure 9A:
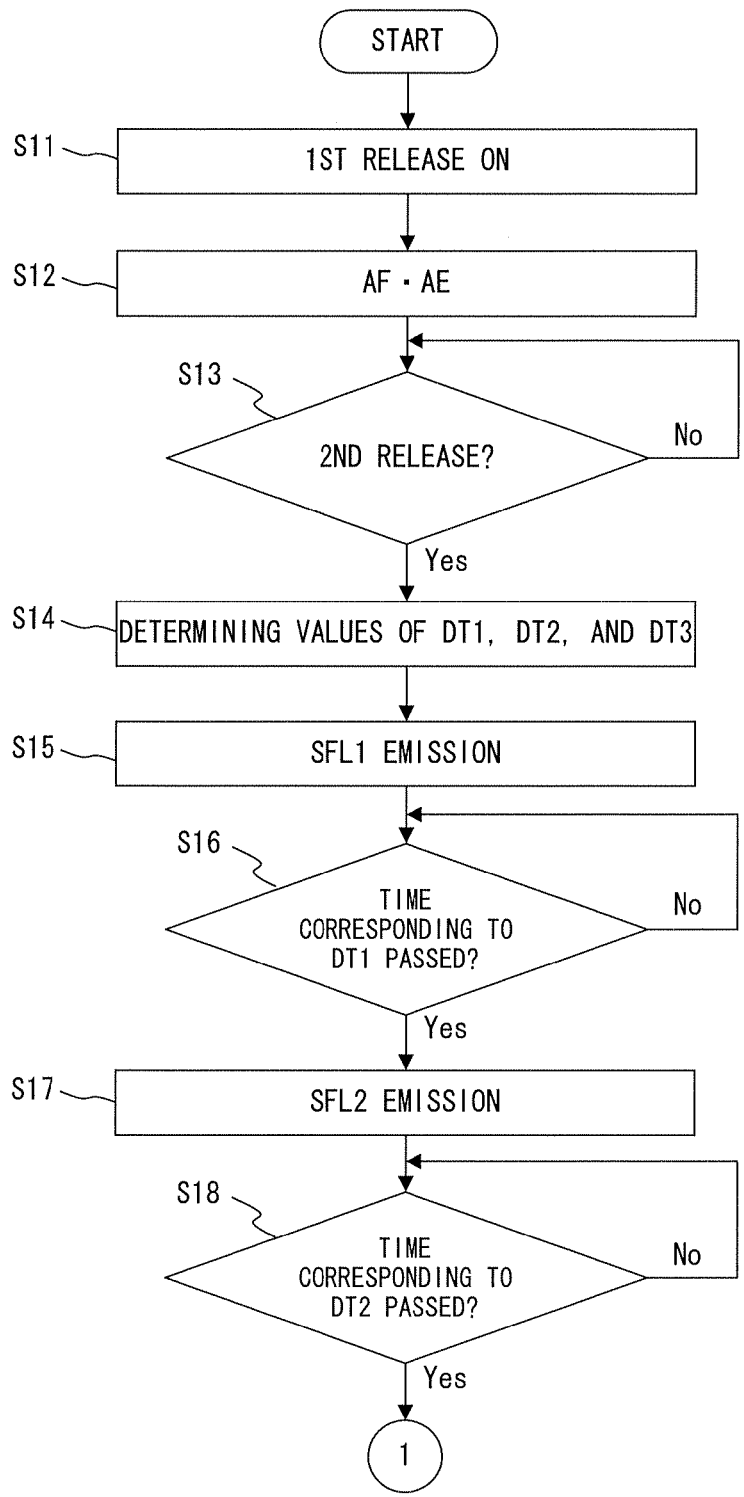
FIG. 9A shows a flow (1) of controlling a camera functioning as a commander flash apparatus in the RC mode in the first embodiment of the present invention.
Figure 9B:
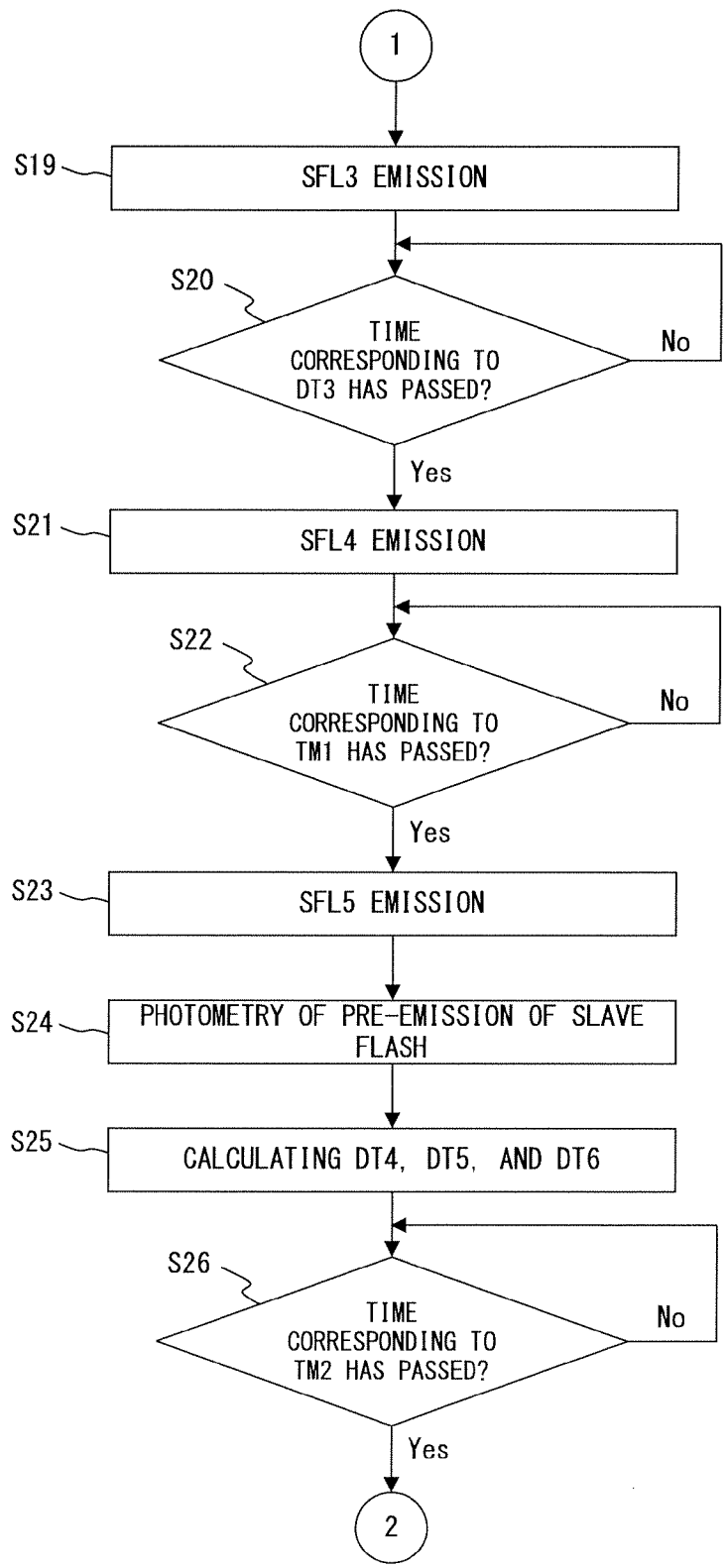
FIG. 9B shows a flow (2) of controlling a camera functioning as a commander flash apparatus in the RC mode in the first embodiment of the present invention.
Figure 9C:
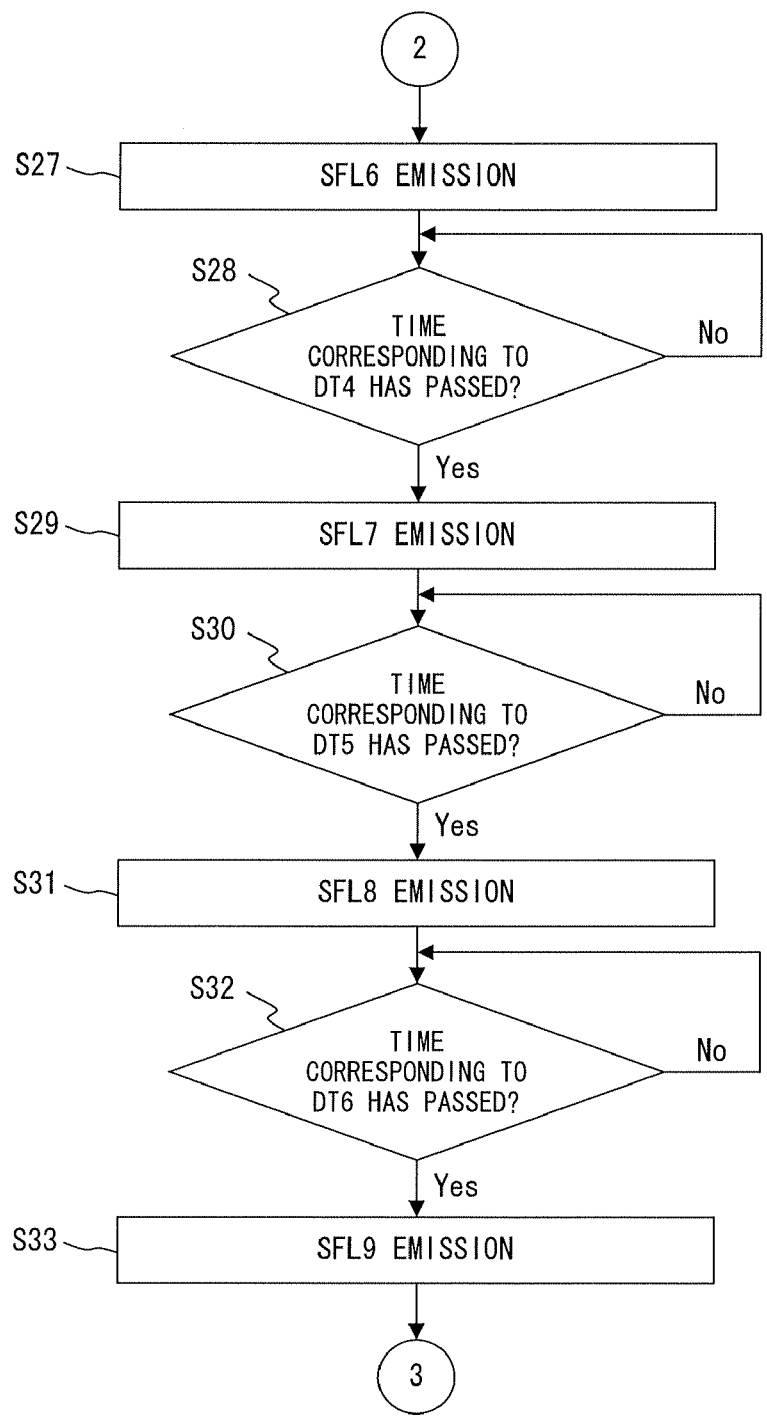
FIG. 9C shows a flow (3) of controlling a camera functioning as a commander flash apparatus in the RC mode in the first embodiment of the present invention.
Figure 9D:
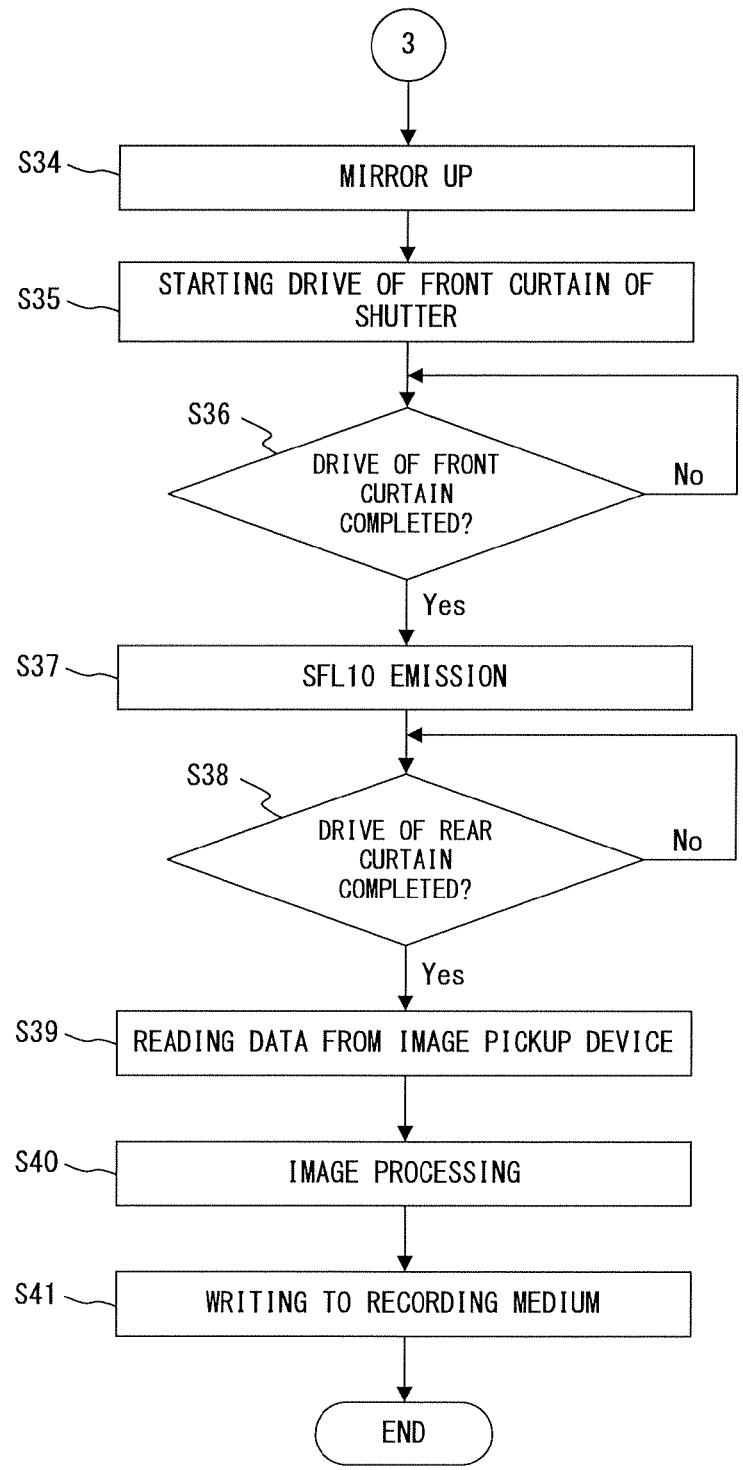
FIG. 9D shows a flow (4) of controlling a camera functioning as a commander flash apparatus in the RC mode in the first embodiment of the present invention.
Figure 10B:
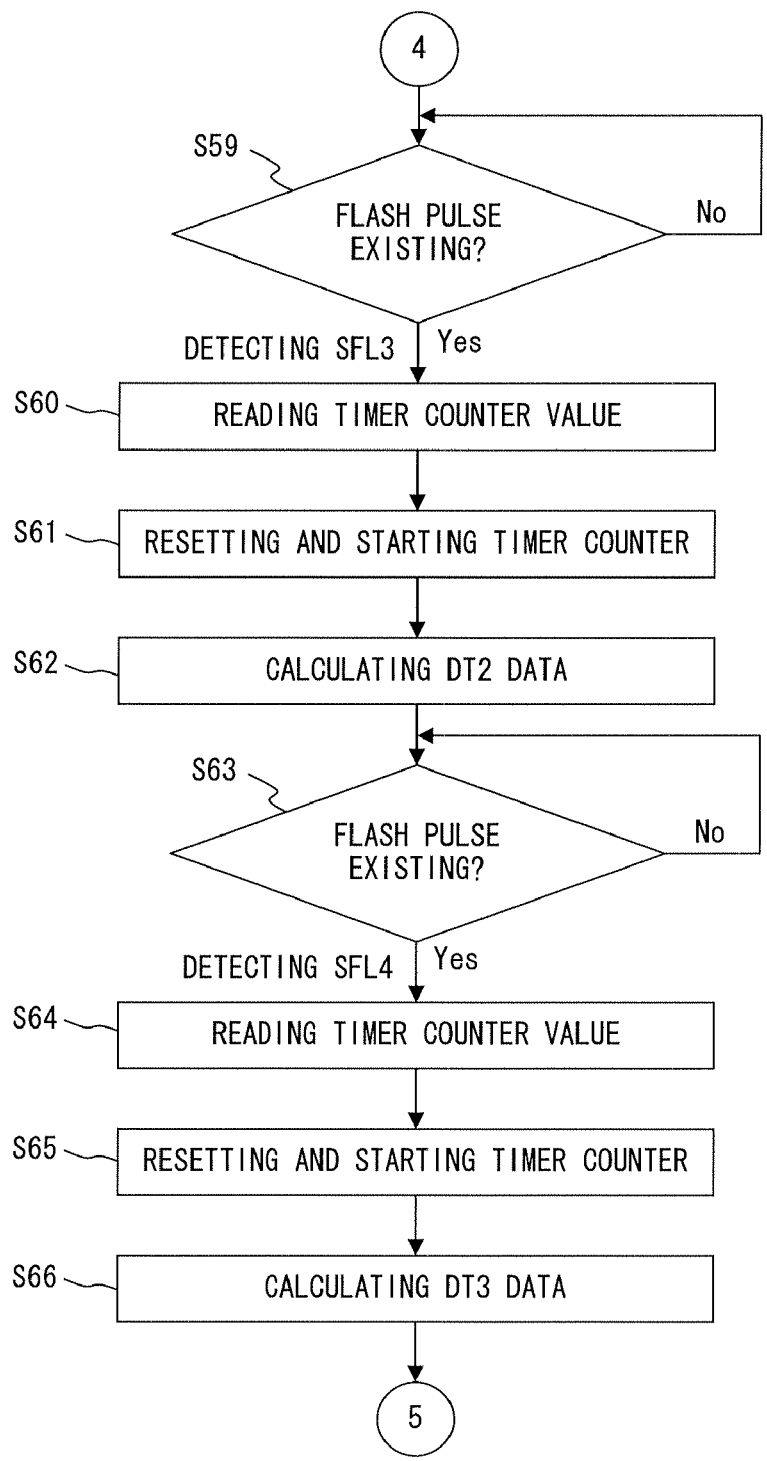
FIG. 10B shows the flow (2) of the operation of the slave flash apparatus according to the first embodiment of the present invention.
Figure 10C:
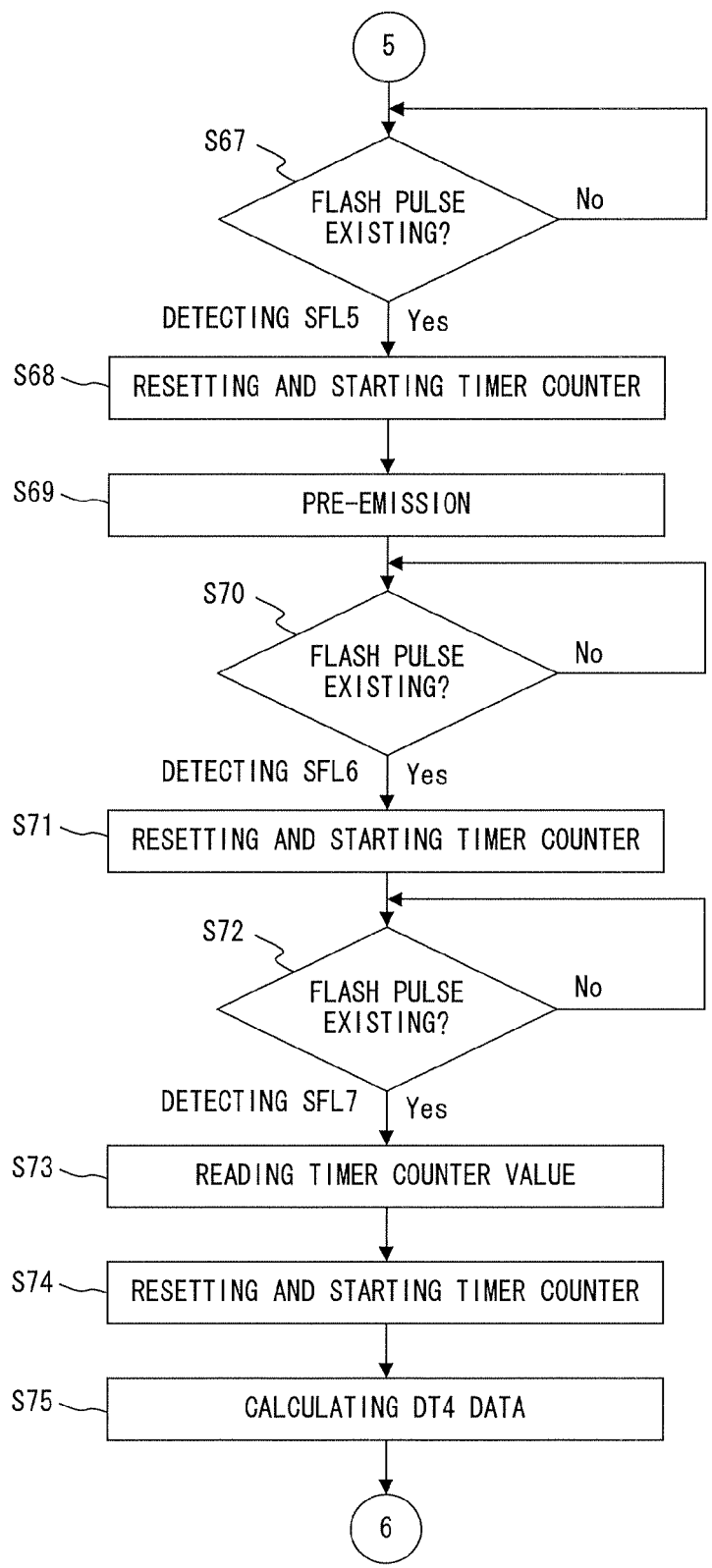
FIG. 10C shows the flow (3) of the operation of the slave flash apparatus according to the first embodiment of the present invention.
Figure 10D:
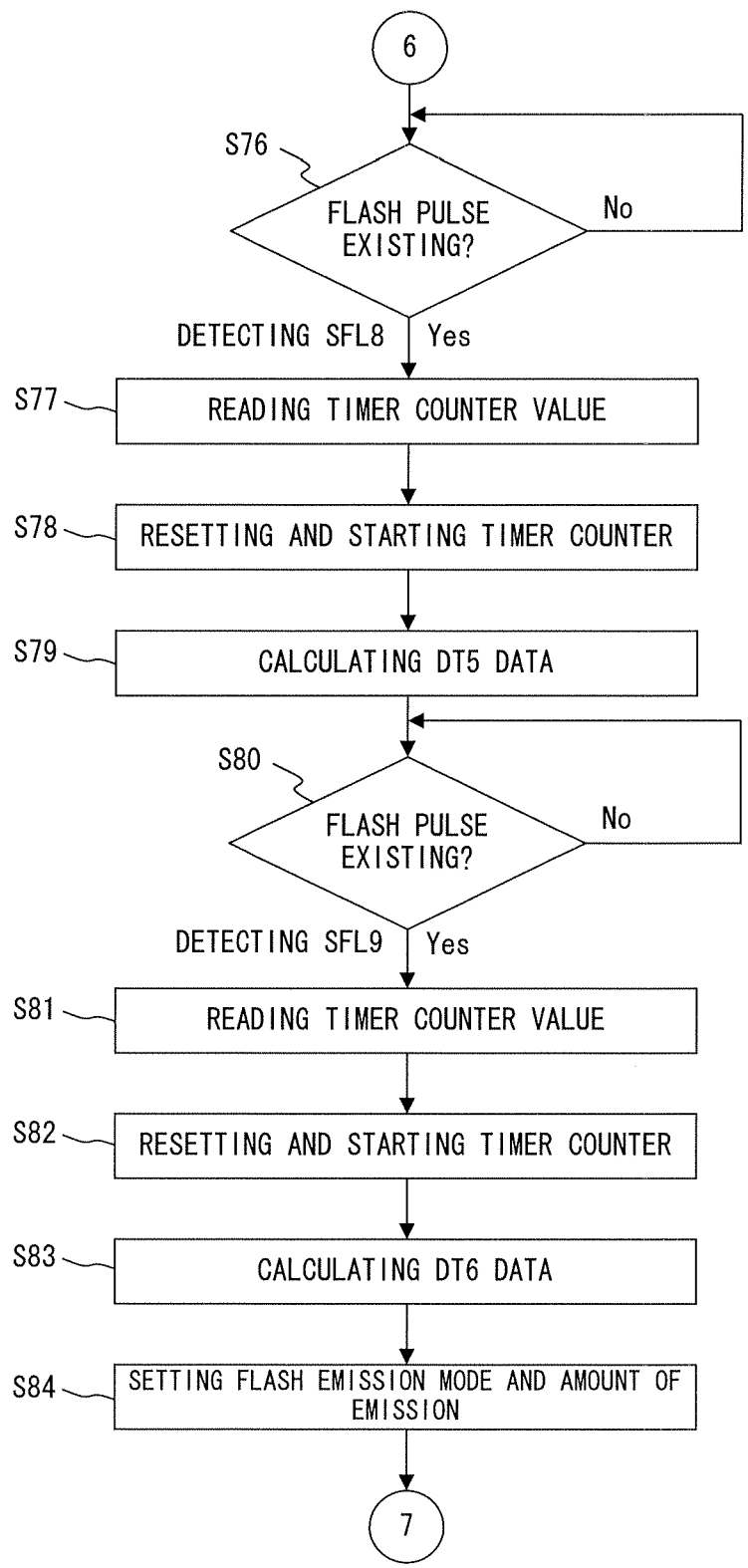
FIG. 10D shows the flow (4) of the operation of the slave flash apparatus according to the first embodiment of the present invention.
Figure 10E:
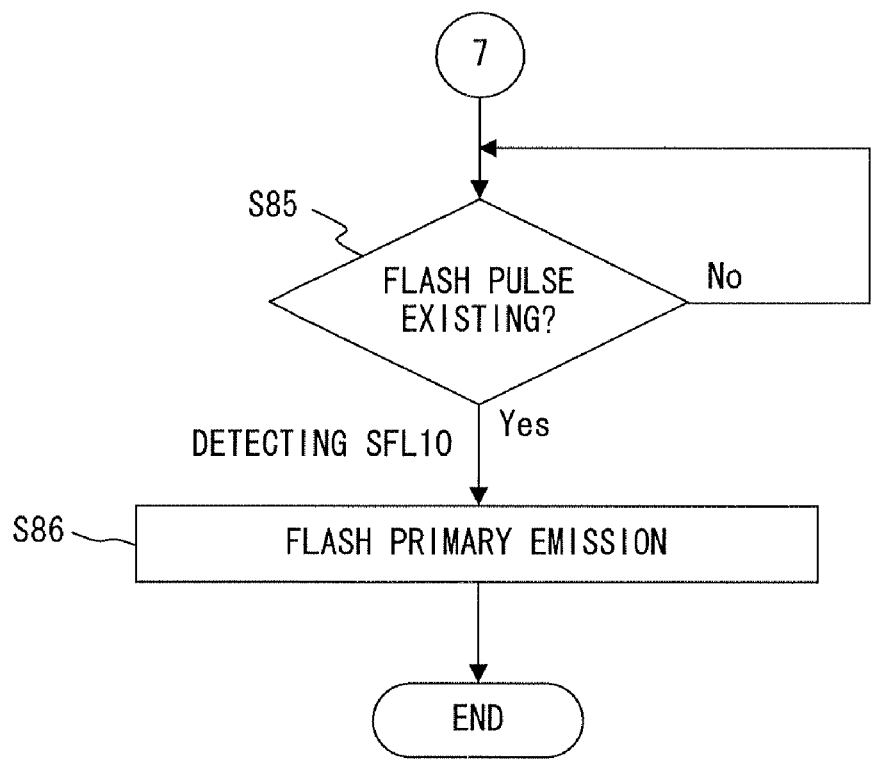
FIG. 10E shows the flow (5) of the operation of the slave flash apparatus according to the first embodiment of the present invention.

FIG. 8 is a flow of setting an RC mode of a camera functioning as a role of the commander flash apparatus for control of a slave flash apparatus in wireless communications according to the present embodiment.

First, when the body drive control circuit 104 determines (S2) that the menu button 4-7 has been operated in the shooting standby state (S1), the circuit transfers the display screen of the back LCD 6 to the setting operation screen (DSP1) (S3).

Next, using a cross key, an OK button, etc., a user can select and set a menu item. The body drive control circuit 104 determines whether or not the RC mode has been turned on with the settings at the termination of the menu (S4). Unless the RC mode has been turned on, control is returned to the screen before opening the menu (S6). If the mode has been turned on, control is passed to the state DSP3 (S5). That is, when the RC mode is set, control is passed to the dedicated display screen which can be displayed only in the RC mode.

FIGS. 9A through 9D show control flows in the RC mode of a camera functioning as a commander flash apparatus according to the present embodiment. First, a user who shoots an image presses the release button 4-1 and the body drive control circuit 104 of a camera detects that the 1st release has been turned on (S11), the body drive control circuit 104 performs AF (auto-focus) and AE (auto-exposure) operations (S12).

Next, the body drive control circuit 104 monitors whether or not the 2nd release has been turned on (S13). If it has confirmed that the 2nd release has been turned on, the body drive control circuit 104 determines each piece of transmission data at DT1, DT2, and DT3, and time T(DT1), T(DT2), and T(DT3) corresponding to DT1, DT2, and DT3 respectively on the basis of a remote flash and a emission mode set before shooting (S14).

Next, the body drive control circuit 104 controls the flash control circuit 102. Then, the flash control circuit 102 starts communication emission using a built-in flash device functioning as a commander flash apparatus. First, the first SFL1 is performed (S15). After the emission, the body drive control circuit 104 monitors whether or not the time corresponding to the DT1 has passed (S16).

Upon confirmation of the passage of the time corresponding to DT1, the body drive control circuit 104 drives the flash control circuit 102, and performs SFL2 as the next communication emission (S17). The body drive control circuit 104 continuously counts the time after the emission of SFL2, and monitors whether or not the time corresponding to DT2 has passed (S18).

Upon confirmation of the passage of the time corresponding to DT2, the body drive control circuit 104 drives the flash control circuit 102, and performs SFL3 as the next communication emission (S19). Then, the body drive control circuit 104 monitors whether or not the time corresponding to DT3 has passed (S20).

Upon confirmation of the passage of the time corresponding to DT3, the body drive control circuit 104 drives the flash control circuit 102, and performs SFL4 as the next communication emission (S21). Thus, the transmission at DT1, DT2, and DT3 is completed.

Next, the body drive control circuit 104 drives the flash control circuit 102, and performs trigger emission for indication of the pre-emission. The body drive control circuit 104 confirms the passage of the time corresponding to the time TM1 for preparation of the pre-emission after each flash apparatus determines received data (S22).

Upon confirmation of the passage of the time corresponding to DT2, the body drive control circuit 104 drives the flash control circuit 102, and performs the trigger emission SFL5 for pre-emission (S23).

Then, since the slave flash apparatus performs the pre-emission, the body drive control circuit 104 performs photometry of a subject field irradiated by the pre-emission by the TTL light control circuit 105 (S24). On the basis of the result of the photometry result, the body drive control circuit 104 determines the amount of emission to be performed by each flash apparatus in the primary emission, or the value corresponding to the amount of emission. The body drive control circuit 104 determines the data DT4, DT5, and DT6 to be transmitted to the slave flash apparatus on the basis of the determined value (S25).

After the emission SFL5, the body drive control circuit 104 counts the passage of time TM2 for preparation of the reception of the next data by each slave flash apparatus (S26).

Upon confirmation of the passage of the time TM2, the body drive control circuit 104 drives the flash control circuit 102 to perform the SFL6 as the next communication emission (S27). By the emission, each slave flash apparatus starts transmitting data for emission control.

After the emission SFL6, the body drive control circuit 104 monitors whether or not the time corresponding to DT4 has passed (S28). Upon confirmation of the passage of the time corresponding to DT4, the body drive control circuit 104 drives the flash control circuit 102 and performs the next SFL7 (S29).

After the emission SFL7, the body drive control circuit 104 monitors whether or not the time corresponding to DT5 has passed (S30). Upon confirmation of the passage of the time corresponding to DT5, the body drive control circuit 104 drives the flash control circuit 102 and performs the next SFL8 (S31).

After the emission SFL8, the body drive control circuit 104 monitors whether or not the time corresponding to DT6 has passed (S32). If the time corresponding to DT6 has passed, the body drive control circuit 104 drives the flash control circuit 102 to emit the SFL9 (S33).

Thus, the data transmission to each slave flash apparatus is completed, and the body drive control circuit 104 passes control to the shooting operation. The body drive control circuit 104 starts mirror up of a quick return mirror (S34).

Upon completion of the mirror up, the body drive control circuit 104 starts a drive of a front curtain of the focal plain shutter (S35). The body drive control circuit 104 determines whether or not the drive of the front curtain has been completed (S36). Upon determination of the completion of the drive of the front curtain, the body drive control circuit 104 emits SFL10 as trigger emission for primary emission (S37). In synchronization with the emission of SFL10, each slave flash apparatus performs the primary emission.

The body drive control circuit 104 confirms whether or not the drive of a rear curtain of the focal plain shutter has been completed (S38). When the body drive control circuit 104 confirms that the drive of the rear curtain has been completed, it determines that the shooting operation has been completed.

Then, the body drive control circuit 104 reads the image data from the image pickup circuit 108 (S39), and performs the image data processing in the image processing circuit 106 (S40). The body drive control circuit 104 writes the processed image data to the record medium 107 (S41), thereby terminating a series of shooting operations (S42).

FIGS. 10A through 10E are flowcharts of the operation of the slave flash apparatus according to the present embodiment. The slave flash apparatus body 11 is set in the RC mode (remote control acceptance mode) by the mode description button not shown in the attached drawings (S51). Then, the flash control circuit 152 turn on the slave sensor 13 (S52), and enters a state in which a signal from the slave sensor 13 is awaited (S53).

When the slave sensor 13 detects a remote sensor signal, that is, a flash pulse of a signal emission is detected, the flash control circuit 152 recognizes that the SFL1 has been detected, and resets and starts a timer counter (S54).

Afterwards, the flash control circuit 152 enters a standby state for detection of the next flash pulse (SFL2 with the current timing) (S55). Upon detection of a flash pulse (SFL2), the flash control circuit 152 reads the value of the timer counter (S56).

The flash control circuit 152 then resets and restarts the timer counter (S57) Then, the flash control circuit 152 calculates the value of the DT1 from the pulse interval time of the detected SFL1 and SFL2 by the time data correspondence table or a corresponding equation (S58).

When the calculation of DT1 is completed, the flash control circuit 152 enters a state in which a flash pulse is awaited again (S59). Afterwards, when a flash pulse (SFL3) is detected, the flash control circuit 152 reads a timer counter (S60).

The flash control circuit 152 then resets and restarts the timer counter (S61). Then, the flash control circuit 152 calculates the value of the DT2 from the pulse interval time of the detected SFL2 and SFL3 by the time data correspondence table or a corresponding equation (S62).

When the calculation of DT2 is completed, the flash control circuit 152 enters a state in which a flash pulse is awaited again (S63). Afterwards, when a flash pulse (SFL4) is detected, the flash control circuit 152 reads a timer counter (S64), and resets and restarts the timer counter (S65).

Then, the flash control circuit 152 calculates the value of the DT3 from the pulse interval time of the detected SFL3 and SFL4 by the time data correspondence table or a corresponding equation (S66).

Thus, the slave flash apparatus completes the reception of a flash pulse for the channel of the data transmitted by the commander flash apparatus and the emission mode for each group.

The flash control circuit 152 enters a wait state for the next flash pulse (S67). If the flash pulse (SFL5) is detected, the flash control circuit 152 recognizes the flash pulse from the commander flash as a trigger signal of pre-emission, and immediately resets and restarts the timer counter (S68), and perform pre-emission (S69). The amount of emission of the pre-emission is fixed to a predetermined value in advance. The slave flash apparatus performs emission by the fixed amount of emission.

Then, the flash control circuit 152 enters a wait state for a flash pulse (S70). When the flash pulse (SFL6) is detected, the flash control circuit 152 resets and restarts the timer counter (S71). The SFL6 becomes a flash pulse for start of the data transmission at and after DT4.

Upon detection of a flash pulse (SFL7) (S72), the flash control circuit 152 reads the timer counter (S73), and resets and restarts the timer counter (S74).

Then, the flash control circuit 152 calculates the data at DT4 from the value of the read timer counter (S75). Then, the flash control circuit 152 enters a wait state for a flash pulse again (S76).

Upon detection of a flash pulse (SFL8), the flash control circuit 152 reads the timer counter (S77), and resets and restarts the timer counter (S78).

Then, the flash control circuit 152 calculates the data at DT5 from the value of the read timer counter (S79). Then, the flash control circuit 152 enters a wait state for a flash pulse again (S80).

Upon detection of a flash pulse (SFL9), the flash control circuit 152 reads the timer counter (S81), and resets and restarts the timer counter (S82).

Then, the flash control circuit 152 calculates the data at DT6 from the value of the read timer counter (S83).

Since the slave flash apparatus have received all data, the flash control circuit 152 adopts the data, the channel at which the slave flash apparatus is set, and the data corresponding to a group, and determines the amount of emission or corresponding data, and stores the data in the register for emission control (S84).

The flash control circuit 152 determines the amount of emission, and then enters a wait state for a flash pulse again (S85). In this state, a trigger for the primary emission is awaited. Upon detection of a flash pulse, the flash control circuit 152 performs the primary emission (S86), thereby terminating the remote controlled shooting in the RC mode of the slave flash apparatus.

FIG. 11 shows the contents of the data at DT1, DT2, and DT3. Each piece of the data at DT1, DT2, and DT3 is configured by 3 bits.

DT1 includes channel data (2 bits) and flash emission/FP emission identification information (1 bit).

DT2 includes data for identification of each of the groups A, B, and C in a mode requiring pre-emission or a mode requiring no pre-emission (1 bit for each of A, B, and C).

DT3 includes data (1 bit for each of A, B, and C) for setting a mode in detail for the groups A, B, and C. A mode can be determined by the combination of the DT3 with the DT1 and DT2.

FIG. 12 shows the correspondence between the data of DT4, DT5, and DT6 and the value for use in the actual emission control. For example, when manual emission is specified, the correspondence between the actually transmitted data and the amount of emission is shown in FIG. 12.

The area around the upper and lower limits indicates the amount of emission of 0. When the value is applied, no emission is performed. When data indicates 2 or 3, the data refers to the maximum amount of emission of 1/1 (full emission). 27 and 28 indicate the minimum amount of emission of 1/256. That is, 0 and the values corresponding to the maximum amount of emission and the minimum amount of emission are assigned the size of 2 bits while each of the intermediate values is assigned one bit.

Not only in manual emission, but also in TTL AUTO and an external automatic operation, the data corresponding to the maximum amount of emission and the minimum amount of emission is assigned larger allowance in data reception than an intermediate value.

According to the present embodiment, in a portion for transmitting data relating to a channel and an emission mode, the time resolution of data is lower than in a portion for transmitting an amount of emission or data for determining an amount of emission. Therefore, a malfunction caused by a channel or a mode not correctly transmitted to a slave flash apparatus side when the clock accuracy of the transmission side or the reception side changes due to a change in temperature or other environmental conditions can be avoided.

According to the present embodiment, the emission time interval of the commander flash apparatus corresponding to the data of the portion for transmitting a channel or an emission mode is set as an emission time interval shorter at the maximum value of possible data than the emission time interval of the amount of emission of the slave flash apparatus or the data corresponding to the amount, thereby reducing the possibility of an error by a clock error increasing in proportion to the emission time interval.

Also according to the present embodiment, since each piece of data is assigned, for example, 5 ms, that is, an offset substantially equal to the amount of change by the data to be transmitted, a total data transfer time does not largely change, thereby reducing the change of a release time lag during shooting.

In addition, since the offset limits the minimum value of the minimum emission interval of a commander flash apparatus to 5 ms, it is not necessary to emit light at very short intervals of 1 ms. Therefore, it is not necessary to provide a circuit capable of continuously emit light to a flash emission circuit for a short time, thereby realizing a smaller and less expensive flash circuit.

Since a next pulse does not reach within 5 ms after the reception of a pulse of a commander flash apparatus, the slave flash apparatus reads a count value of the timer counter corresponding to the pulse interval of the commander flash, recognizes the contents, and converts them for use in control, thereby avoiding a loss of a time by interfering with the data transmission from the commander flash apparatus due to the recognition time.

As shown in FIG. 12, a larger size of corresponding data is set not to incur a large emission mode change by a large error when data reception error is large at a portion around a maximum value or a minimum value, a portion of an amount of emission of 0, etc. where a limit value is assumed or a discontinuous or a sudden change in amount of emission is expected. Therefore, when a clock error of a timer counter is large due to a severe temperature condition etc., a small amount of degradation in accuracy does not cause extreme emission accuracy error.

Second Embodiment

Described in the present embodiment is the wireless flash system capable of permitting and prohibiting flash shooting of wireless remote control (RC mode) by switching the information display mode of the display panel of the back LCD 6.

Figure 13:
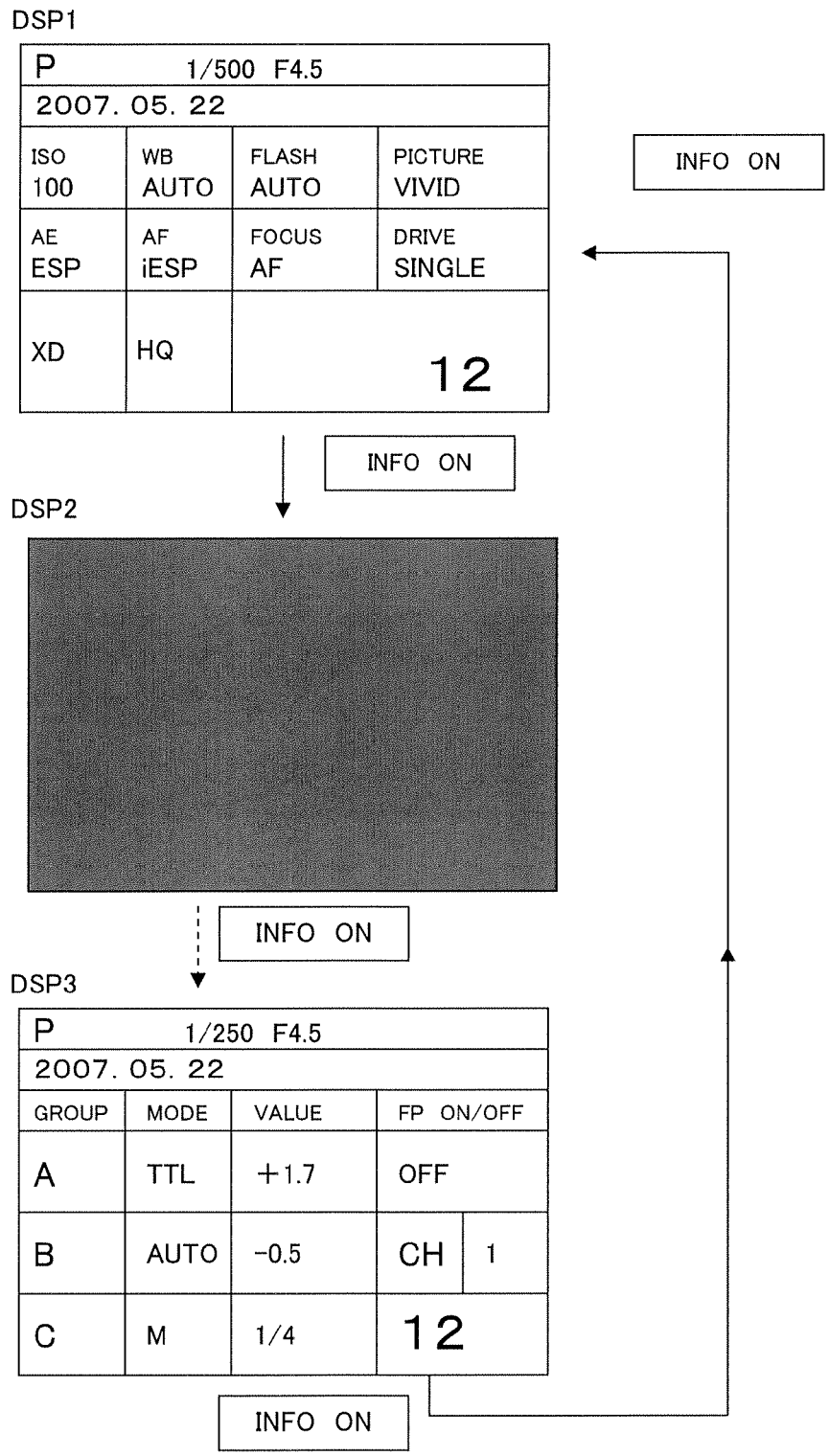
FIG. 13 shows the shooting condition display screen according to the second embodiment of the present invention.

FIG. 13 shows a shooting condition display screen according to the present embodiment. FIG. 14 shows the correspondence table of the shooting condition display screen according to the present embodiment and the RC mode ON/OFF. As shown in FIG. 13, the DSP1, DSP2, and DSP3 can be switched by the INFO button 4-6 according to the present embodiment. There are no settings of RC mode ON/OFF on the menu, and the RC mode is automatically entered when the DSP3 is displayed as shown in FIG. 14.

According to the present embodiment, the RC mode can be switched by the information display mode to the back LCD. Therefore, it is convenient for a user that frequently switches ON/OFF of the RC mode.

Third Embodiment

Described below is a wireless flash system for controlling a slave flash apparatus by wireless by an external commander flash apparatus provided separately from a camera and attached to the hot shoe of the camera according to the present embodiment.

FIG. 15 shows the state when the wireless flash system according to the present embodiment is used. In FIG. 15, a slave flash apparatus is controlled by wireless by an external commander apparatus provided separately from a camera and attached to the hot shoe of the camera.

Figure 16:
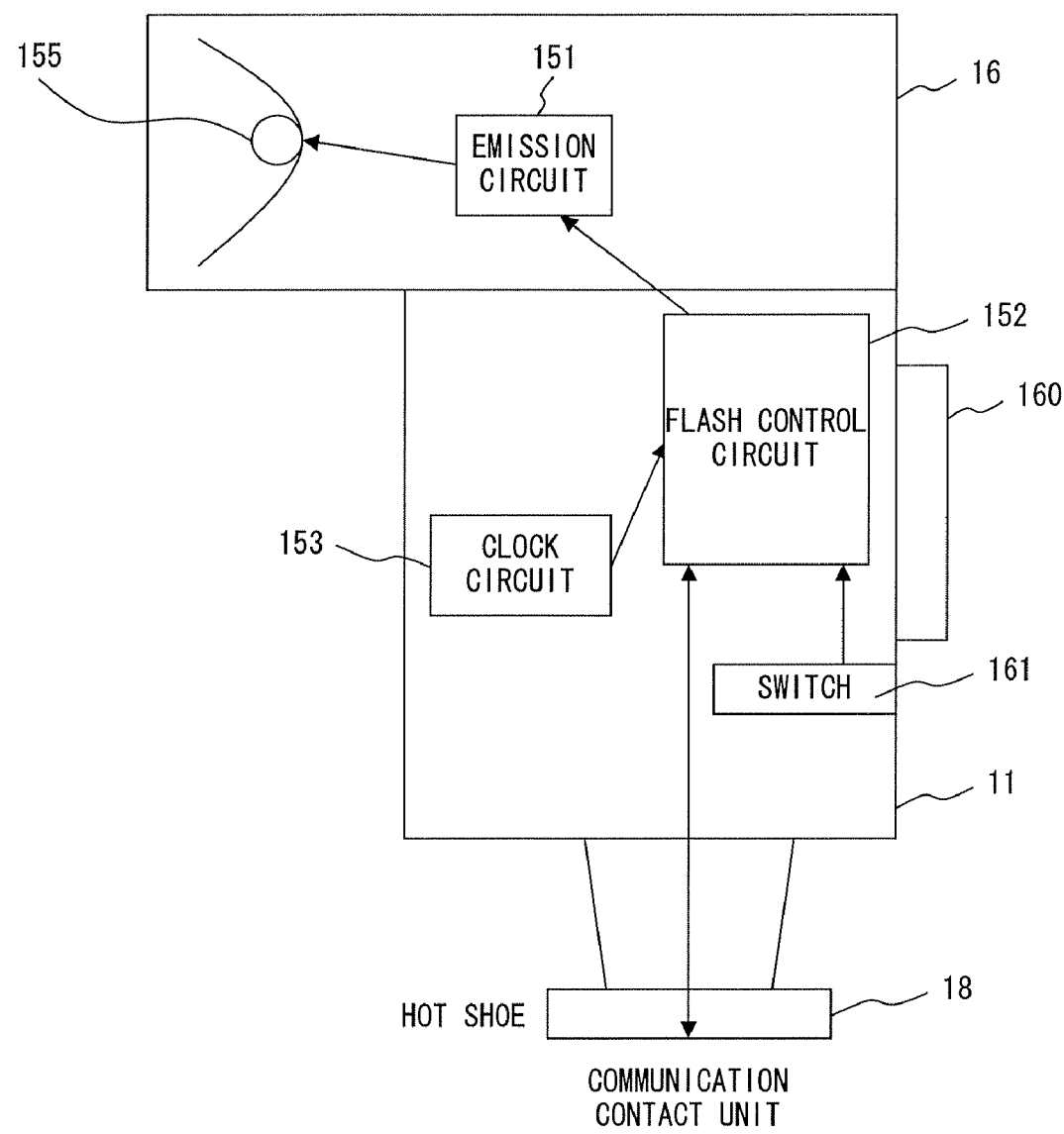
FIG. 16 is a block diagram of the commander flash apparatus according to the third embodiment of the present invention.

FIG. 16 is a block diagram of the commander flash apparatus according to the present embodiment. The time control of the communication emission is performed by counting the time on the basis of the clock circuit 153 in the commander flash apparatus. An instruction to start a series of operations is issued in the communications from the camera body 1.

FIG. 17 shows the panel display of the back LCD 160 of the commander flash apparatus according to the present embodiment. Setting of each set value is similar to setting for the camera body 1 according to the first embodiment. Also the communication emission mode is similar to that according to the first embodiment.

Figure 18:
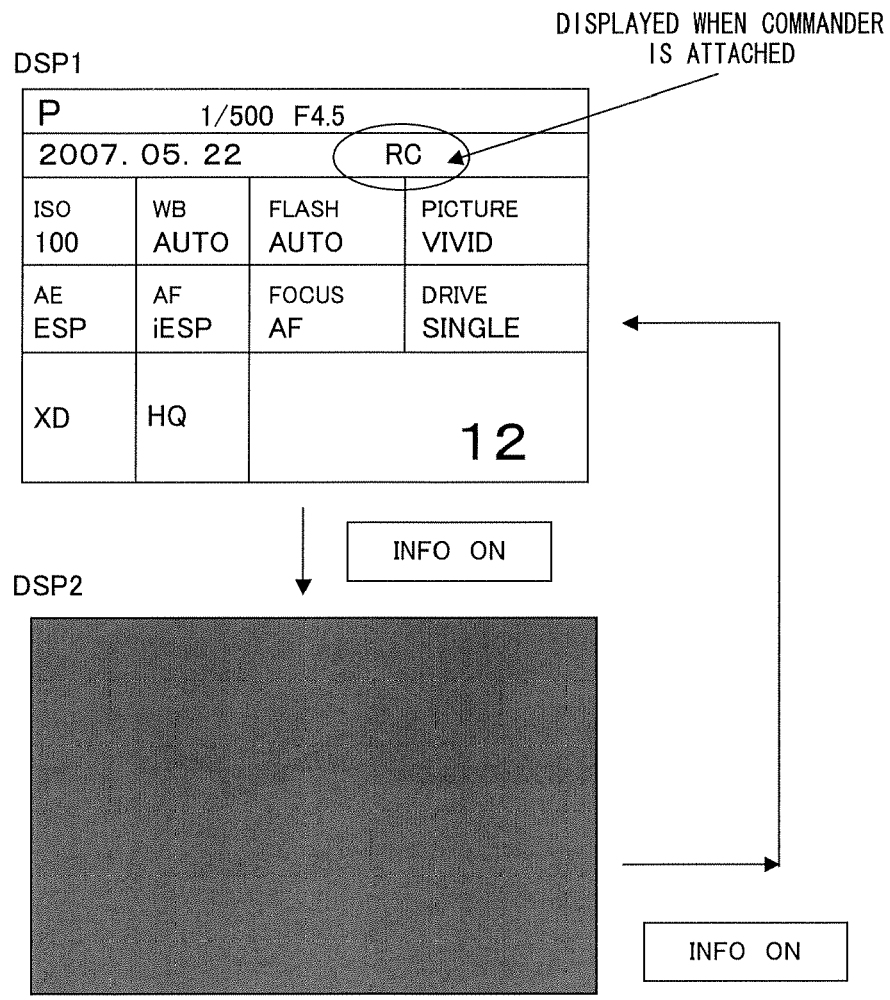
FIG. 18 shows the shooting condition display screen according to the third embodiment of the present invention.

FIG. 18 shows a shooting condition display screen according to the present embodiment. When the commander flash apparatus 11 is attached to the camera body 1, and a power switch 161 of a commander flash apparatus is turned on, the camera body 1 is forcibly transferred to the RC mode. At this time, various settings are made on the commander flash apparatus side.

As shown in FIG. 18, the DSP3 is not displayed although the RC mode is entered. The DSP1 and the DSP2 are switched by pressing the INFO button. However, the RC mark indicating the RC mode is displayed on the DSP1.

Since the commander apparatus is separately provided according to the present embodiment, the setting of each wireless flash is displayed on the flash apparatus side while other settings such as DSP1 are displayed on the camera, thereby performing a shooting operation by watching both settings.

In addition, with the configuration in which a battery is built in the commander flash apparatus, the consumption of the battery of the body can be reduced. Furthermore, a commander apparatus can be attached when the RC mode is used, and it is not necessary to set the RC mode from the menu. Therefore, it is convenient when the RC mode is used separately from the non-RC mode.

Fourth Embodiment

A wireless flash system according to the present embodiment controls a slave flash apparatus by wireless by an external commander flash apparatus provided separately from a camera and attached to the hot show of a camera.

Figure 19:
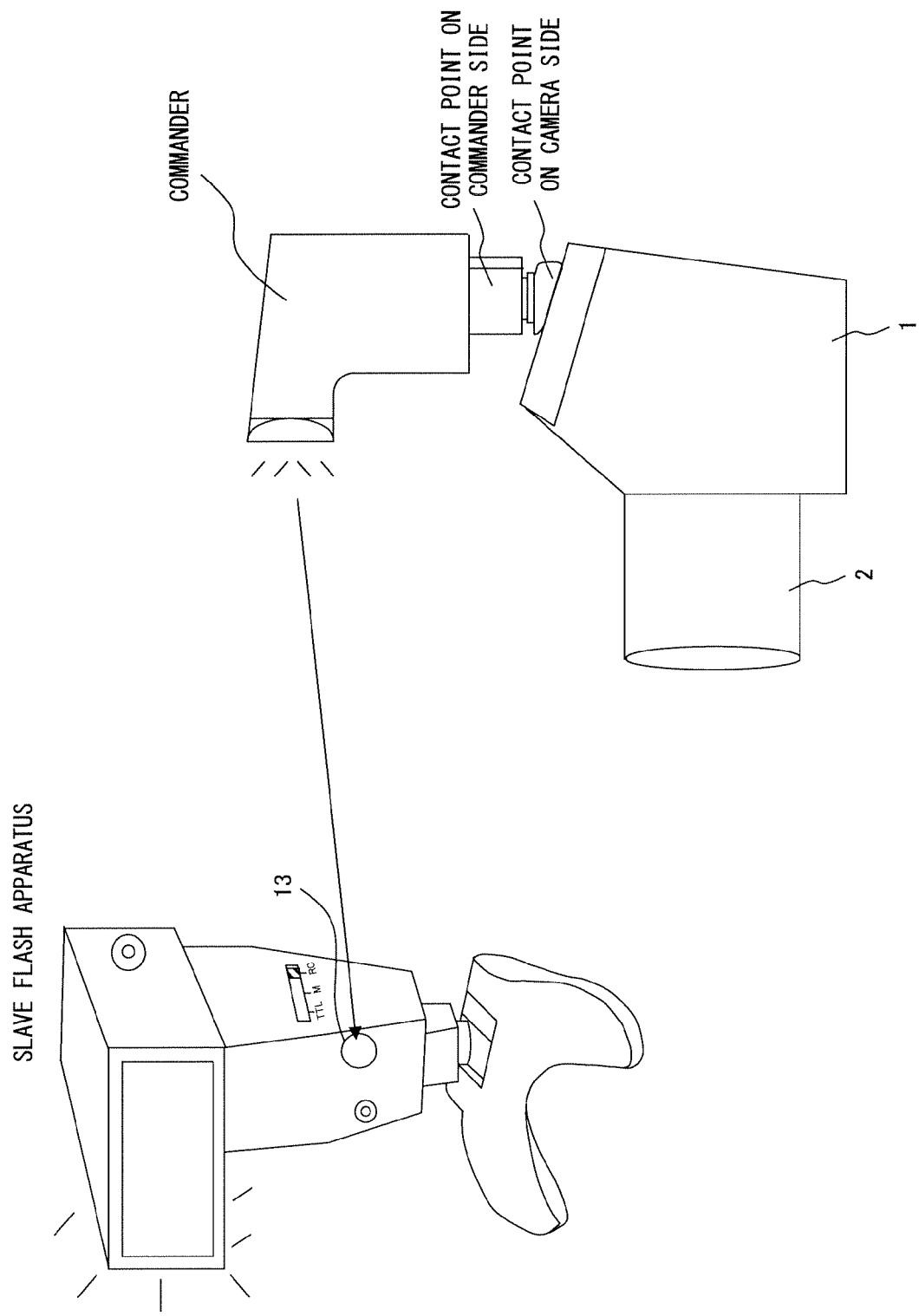
FIG. 19 shows the situation when wireless flash system according to the fourth embodiment of the present invention is used.

FIG. 19 shows the state when the wireless flash system according to the present embodiment is used. In FIG. 19, an external commander flash apparatus provided separately from the camera and attached to the hot show of the camera controls the slave flash apparatus by wireless. In the present embodiment, the setting relating to the wireless control is performed on the camera side.

Figure 20:
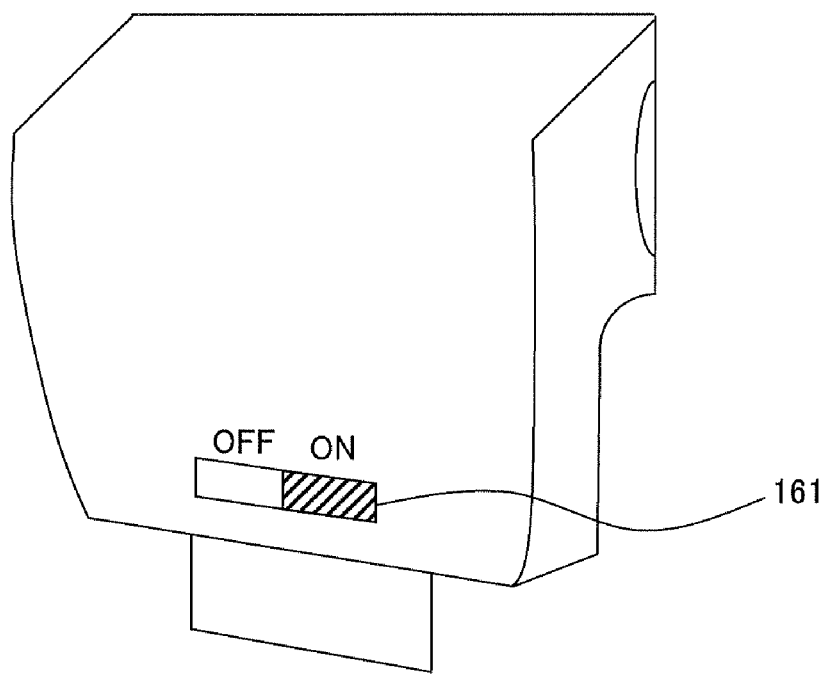
FIG. 20 shows the back of the external commander flash apparatus according to the fourth embodiment of the present invention.

FIG. 20 shows the back of the external commander flash apparatus according to the present embodiment. Unlike the third embodiment, the commander flash apparatus has no LCD panel in the present embodiment, and settings are displayed on the camera body 1. The external commander flash apparatus according to the present embodiment is provided only with the switch 161 for turning on/off the commander flash apparatus.

Figure 21:
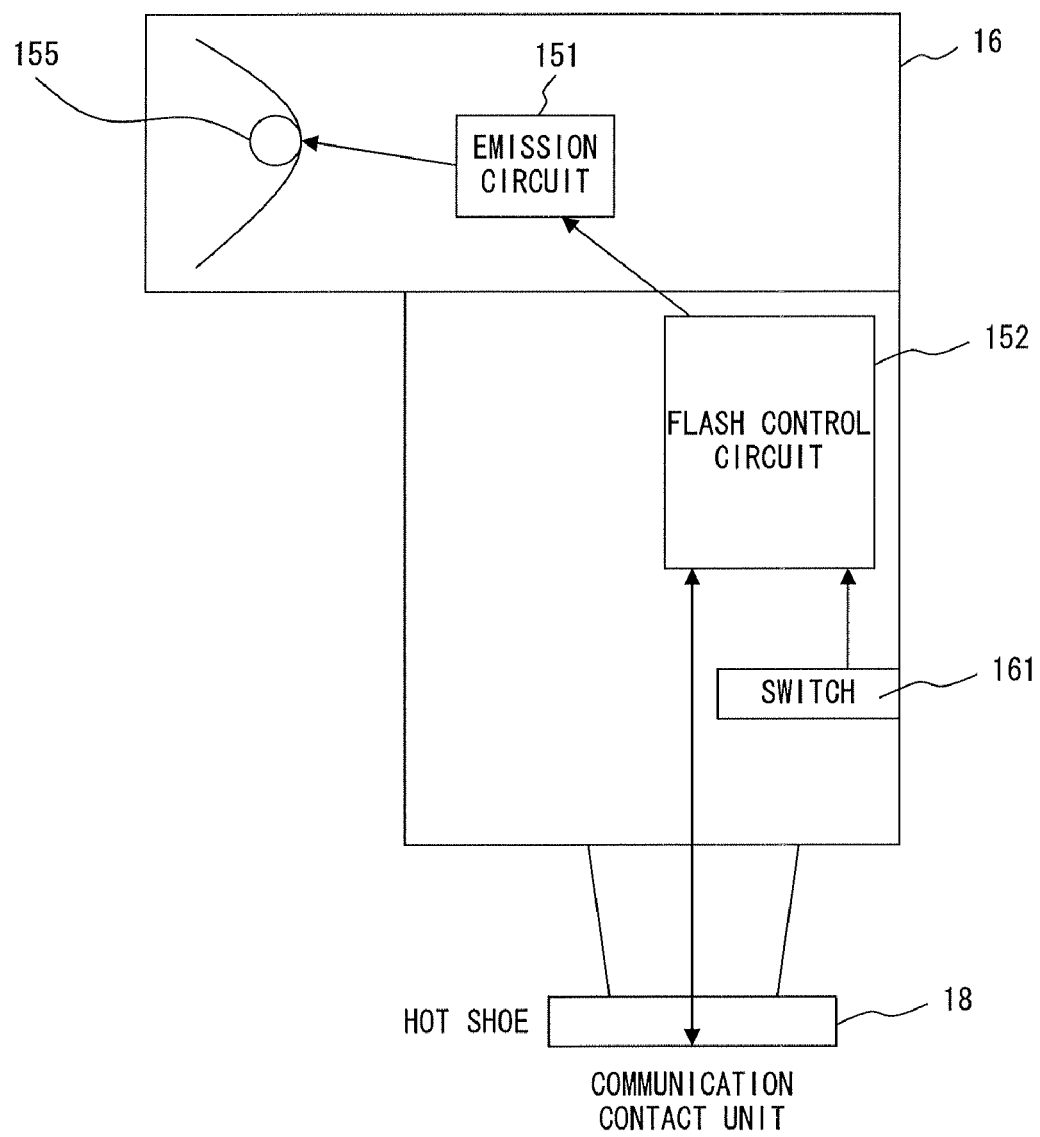
FIG. 21 is a block diagram of the commander flash apparatus according to the fourth embodiment of the present invention.

FIG. 21 is a block diagram of the commander flash apparatus according to the present embodiment. The external commander flash apparatus of the present embodiment does not perform communication time control on the flash apparatus side, but controls the flash side apparatus by time count on the camera side.

Figure 22:
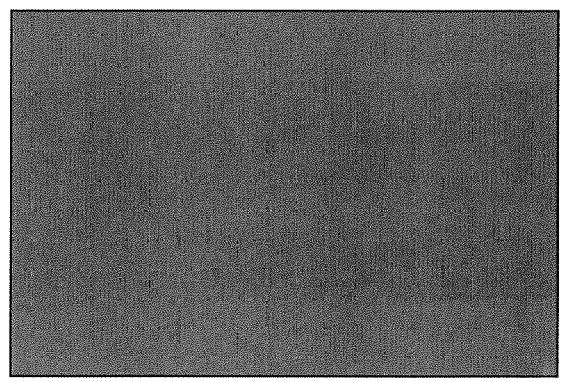
FIG. 22 shows the shooting condition display screen according to the fourth embodiment of the present invention.

FIG. 22 shows the shooting condition display screen according to the present embodiment. When the commander flash apparatus according to the present embodiment is attached to the camera body and is turned on, the camera enters the RC mode. It can be considered that the display at this time is performed by replacing the built-in commander flash apparatus according to the first embodiment with the external commander flash apparatus as shown in FIG. 22. When the external commander flash apparatus is attached, the RC mark indicating the RC mode is displayed on the DSP1 and the DSP3. The communication mode according to the present embodiment is similar to that of the first embodiment.

With the built-in battery in the commander flash apparatus according to the present embodiment, the consumption of the battery of the body can be reduced. In addition, the commander flash apparatus can be attached to the camera body when the RC mode is used, and it is not necessary to set the RC mode from the menu. Therefore, it is convenient when the RC mode is used separately from the non-RC mode. Furthermore, as compared with the third embodiment, a smaller and less expensive commander apparatus can be configured.

For each of the above-mentioned embodiments, it is not necessary to provide the commander flash apparatus in the camera, but the commander flash apparatus can be provided by combining a camera with a commander device. In this case, the functions of displaying settings and changing settings can be performed on the camera side, or by a commander device combined with the camera. The values used in each of the embodiments are only examples, but can be changed within the gist of the present invention.

The data for control of DT1, DT2, and DT3 can be not only the information about a channel and an emission mode of a flash, but also the information for test and special uses such as test emission, modeling emission, repetitive emission, etc.

In addition, when a flash apparatus is configured by a plurality of light sources or a plurality of emission units, the information about the selection or the combination can be included.

The data for determination of an amount of emission at DT4, DT5, and DT6 can include not only the information about the guide number of an amount of emission, a ratio of an amount of emission to full emission, a relative amount of emission to pre-emission, the ISO sensitivity and iris of a camera used when light control is performed by a light control sensor of a flash apparatus, but also the data for correction or optimization of an amount of emission such as a zoom value of a taking lens of the camera, the distance between the camera and a subject, the bright/dark distribution of a subject, etc.

The transmission unit can be not only a flash device using flash light of a xenon tube, but also other emission units such as an LED (light emitting diode) etc.

According to the present invention, in the wireless flash system for transmitting data to a slave flash apparatus at emission intervals of a commander flash apparatus, an image can be shot with a short time lag without generating a serious malfunction although less expensive circuit elements are used.

By applying the present invention, an emitting operation of a slave flash apparatus in a wireless flash system can be performed with the shortest possible time lag with suppressed malfunctions.

The present invention is not limited to the above-mentioned embodiments, but can be variously configured or embodies within the gist of the present invention.

What is claimed is:

1. A commander flash apparatus for use in a wireless flash system which continuously emits light from the commander flash apparatus, transmits data, from the commander flash apparatus to a slave flash apparatus, corresponding to emission time interval of the commander flash apparatus, and controls flash emission of a slave flash apparatus, comprising:
   a data setting unit setting emission control data for control of emission of the slave flash apparatus and emission amount determination data for determination of an amount of emission of the slave flash apparatus as transmission data; and
   a data transmission control unit controlling emission of the commander flash apparatus so that emission time interval per bit of digital data, for a given number of bits, configuring the emission control data, is longer than emission time interval per bit of digital data, for the given number of bits, configuring the emission amount determination data, thereby controlling the data transmission.

2. The apparatus according to claim 1, wherein
the emission control data includes at least one of emission mode data for setting an emission mode of the slave flash apparatus and channel data for protection against mutual crosstalk between users by identifying a plurality of slave flash apparatuses.

3. The apparatus according to claim 1, wherein
the data transmission control unit controls emission of the commander flash apparatus so that an amount of time allowance of data within upper and lower limits of an amount of emission of the slave flash apparatus can be larger than an amount of time allowance of the data in a range other than the upper and lower limits.

4. The apparatus according to claim 1, wherein
the data transmission control unit controls emission of the commander flash apparatus so that a number of bits of digital data configuring the emission control data transmitted at emission intervals of the commander flash apparatus can be smaller than a number of bits of digital data configuring the emission amount determination data transmitted at the emission intervals of the commander flash apparatus.

5. The apparatus according to claim 1, wherein
the data transmission control unit controls emission of the commander flash apparatus so that a maximum emission time interval corresponding to digital data configuring the emission control data can be shorter than a maximum emission time interval corresponding to digital data configuring the emission amount determination data.

6. The commander flash apparatus according to claim 1, wherein
the data transmission control unit controls emission of the commander flash apparatus so that an offset of emission time interval corresponding to digital data of the emission control data can be substantially equal to an offset of emission time interval corresponding to digital data configuring the emission amount determination data, and the offset time can be larger than an intermediate value of a amount of maximum change corresponding to the transmission data.

7. The apparatus according to claim 1, wherein
the data transmission control unit sets time obtained by adding time corresponding to the transmission data to a predetermined fixed time as emission time interval of a flash, and controls emission of the commander flash apparatus on a basis of the set emission time interval.

8. The apparatus according to claim 1, wherein
the commander flash apparatus can further function as the slave flash apparatus, and further comprises:
a reception unit receiving the transmission data from another commander flash apparatus; and
a emission control unit controlling emission of the commander flash apparatus on a basis of the received data.

9. The apparatus according to claim 1, further comprising
a display screen for settings relating to emission of the slave flash apparatus and for displaying setting contents separately by rows or columns, wherein
the data transmission control unit controls emission of the commander flash apparatus so that data corresponding to a predetermined row or column of the display screen can be longer in time per bit of digital data during transmission.

10. An image pickup apparatus comprising the commander flash apparatus according to claim 1.

11. An image pickup apparatus comprising the commander flash apparatus according to claim 2.

12. An image pickup apparatus comprising the commander flash apparatus according to claim 3.

13. An image pickup apparatus comprising the commander flash apparatus according to claim 4.

14. An image pickup apparatus comprising the commander flash apparatus according to claim 5.

15. An image pickup apparatus comprising the commander flash apparatus according to claim 6.

16. An image pickup apparatus comprising the commander flash apparatus according to claim 7.

17. An image pickup apparatus comprising the commander flash apparatus according to claim 8.

18. An image pickup apparatus comprising the commander flash apparatus according to claim 9.

19. A slave flash apparatus which receives data from the commander flash apparatus according to claim 1, comprising
an emission control unit controlling emission of the slave flash apparatus on a basis of the received data.

20. The apparatus according to claim 19, further comprising
an emission data processing unit converting data corresponding to an emission time interval of a flash receiving the data at a flash pulse immediately before in emitted flash pulses on a basis of an emission time interval of a flash expressed by time obtained by adding time corresponding to the transmission data to a predetermined fixed time by the commander flash apparatus into data for use in primary emission control within the predetermined fixed time until a next flash pulse is generated.

21. A commander flash apparatus for use in a wireless flash system which continuously emits light from the commander flash apparatus, transmits data, from the commander flash apparatus to a slave flash apparatus, corresponding to emission time interval of the commander flash apparatus, and controls flash emission of a slave flash apparatus, comprising:

a data setting unit setting emission control data for control of emission of the slave flash apparatus and emission amount determination data for determination of an amount of emission of the slave flash apparatus as transmission data; and a data transmission control unit controlling emission of the commander flash apparatus so that emission time interval per value of digital data configuring the emission control data, is longer than emission time interval per value of digital data configuring the emission amount determination data, thereby controlling the data transmission.

* * * * *